(12) United States Patent
Dahl et al.

(10) Patent No.: US 12,031,851 B2
(45) Date of Patent: Jul. 9, 2024

(54) ACTUATOR APPARATUS WITH LIGHT ACTUATED POSITION SENSOR AND SECURE POSITION VERIFICATION

(71) Applicant: DTL Linear, LLC., Cody, WY (US)

(72) Inventors: David Dahl, Cody, WY (US); David E. Eichstadt, Northbrook, IL (US); Robert Charles DeBlieck, Algonquin, IL (US)

(73) Assignee: DTL Linear, LLC, Cody, WY (US)

( * ) Notice: Subject to any disclaimer, the term of this patent is extended or adjusted under 35 U.S.C. 154(b) by 0 days.

(21) Appl. No.: 18/385,546

(22) Filed: Oct. 31, 2023

(65) Prior Publication Data

US 2024/0060801 A1 Feb. 22, 2024

Related U.S. Application Data

(63) Continuation-in-part of application No. 17/742,931, filed on May 12, 2022.

(51) Int. Cl.
*G01D 5/34* (2006.01)
*F16C 41/00* (2006.01)
*G01D 5/347* (2006.01)

(52) U.S. Cl.
CPC ........... *G01D 5/347* (2013.01); *F16C 41/007* (2013.01)

(58) Field of Classification Search
CPC ...... G01D 5/34; G01D 5/347; G01D 5/34715; F16C 41/007
See application file for complete search history.

(56) References Cited

U.S. PATENT DOCUMENTS

| | | | |
|---|---|---|---|
| 4,894,533 | A | 1/1990 | Abe et al. |
| 5,065,012 | A | 11/1991 | Moriyama et al. |
| 6,145,213 | A | 11/2000 | Shimano et al. |
| 8,376,381 | B2 | 2/2013 | Shalaby et al. |
| 8,527,101 | B2 | 9/2013 | Burris et al. |
| 8,773,237 | B2 | 7/2014 | Burris et al. |
| 9,631,712 | B2 | 4/2017 | Ikeda |
| 9,638,550 | B2 | 5/2017 | Vokinger et al. |

(Continued)

FOREIGN PATENT DOCUMENTS

| CN | 208474232 U | 2/2019 |
|---|---|---|
| DE | 9114056 U1 | 11/1991 |

(Continued)

*Primary Examiner* — Kevin K Pyo
(74) *Attorney, Agent, or Firm* — Kunzler Bean & Adamson; Bruce R. Needham

(57) ABSTRACT

An actuator apparatus includes an actuator rod with a interior cavity and a set of rod holes extending through the actuator rod to the cavity. The apparatus includes a light assembly positioned to light the cavity and an actuator block with an opening sized to conform to an outer surface of the actuator rod and one or more block holes in the opening. Each of the block holes is positioned to align with each of the rod holes as the actuator rod moves with respect to the actuator block. The actuator block includes a light sensor positioned to sense light coming through a rod hole aligned with the block hole. The apparatus includes a verification module with a light modulator that modulates light of the light assembly to transmit a position signal, and a verification circuit that transmits a verification signal after the light sensor receives the position signal.

20 Claims, 14 Drawing Sheets

(56) References Cited

U.S. PATENT DOCUMENTS

| | | |
|---|---|---|
| 9,869,347 B2 | 1/2018 | Fujioka |
| 2002/0070334 A1 | 6/2002 | Hasegawa et al. |
| 2002/0088933 A1 | 7/2002 | Yu et al. |
| 2004/0256546 A1 | 12/2004 | Hsiao et al. |
| 2011/0252598 A1 | 10/2011 | Burris et al. |
| 2017/0292543 A1 | 10/2017 | Nikolic |
| 2021/0325209 A1 | 10/2021 | Baker |
| 2022/0065667 A1 | 3/2022 | Ueno et al. |
| 2022/0187104 A1* | 6/2022 | Parpajola ........... G01D 5/34707 |

FOREIGN PATENT DOCUMENTS

| | | |
|---|---|---|
| DE | 19619113 A1 | 5/1996 |
| EP | 2459969 B1 | 7/2010 |
| JP | 60113110 A | 11/1983 |
| JP | 6173004 A | 9/1984 |
| WO | 9704286 A1 | 2/1997 |

* cited by examiner

Section A-A'

ACTUATOR APPARATUS WITH LIGHT ACTUATED POSITION SENSOR AND SECURE POSITION VERIFICATION

CROSS-REFERENCES TO RELATED APPLICATIONS

This is a continuation-in-part application of and claims priority to U.S. patent application Ser. No. 17/742,931 entitled "ACTUATOR APPARATUS WITH PRECISION BEARINGS AND LIGHT SENSOR" and filed on May 12, 2022 for David Dahl, which is incorporated herein by reference.

FIELD

This invention relates to tracking movement and more particularly relates to an actuator apparatus with a light actuated position sensor and secure position verification.

BACKGROUND

Often robotics, assembly lines, medical procedures, etc. require precise movement. Many approaches have been used for tracking movement for precise placement of various devices and for other purposes. In addition, position verification is crucial in some applications were unwanted movement may be catastrophic.

SUMMARY

An apparatus for securely verifying position of a rod hole with respect to a light sensor includes an actuator rod with an interior cavity and a set of rod holes. Each rod hole of the set of rod holes extends through the actuator rod to the cavity. The set of rod holes are positioned along a line. The apparatus includes a light assembly positioned to light the cavity and an actuator block with an opening in the actuator block sized to conform to an outer surface of the actuator rod and one or more block holes in the opening. Each of the one or more block holes is positioned to align with each of the set of rod holes as the actuator rod moves with respect to the actuator block. The actuator block includes a light sensor positioned in a block hole of the one or more block holes to sense light coming through a rod hole aligned with the block hole. The apparatus includes a verification module with a light modulator configured to modulate light of the light assembly to transmit a position signal, and a verification circuit configured to transmit a verification signal in response to the light sensor receiving the position signal.

A system for securely verifying position of a rod hole with respect to a light sensor includes an actuator rod with an interior cavity and a set of rod holes. Each rod hole of the set of rod holes extends through the actuator rod to the cavity. Each rod hole of the set of rod holes is positioned along a line. The system includes a light assembly positioned to light the cavity and an actuator block. The actuator block includes an opening in the actuator block sized to conform to an outer surface of the actuator rod, one or more block holes in the opening, where each of the one or more block holes is positioned to align with each of the set of rod holes as the actuator rod moves with respect to the actuator block, a light sensor positioned in a block hole of the one or more block holes to sense light coming through a rod hole aligned with the block hole, and a verification module. The verification module includes a position module configured to transmit an aligned signal in response to light at the light sensor reaching an alignment threshold, a light modulator configured to modulate light of the light assembly to transmit a position signal in response to the aligned signal, and a verification circuit configured to transmit a verification signal in response to the light sensor receiving the position signal. The system includes a mover apparatus configured to move the actuator block with respect to the actuator rod in a direction such that lines connecting each rod hole of the set of rod holes maintain alignment with lines connecting each block hole of the set of block holes.

Another apparatus for securely verifying position of a rod hole with respect to a light sensor includes an actuator rod with an interior cavity and a set of rod holes. Each rod hole of the set of rod holes extends through the actuator rod to the cavity. The set of rod holes is positioned along a line. The apparatus includes a light assembly positioned to light the cavity and an actuator block. The actuator block includes an opening in the actuator block sized to conform to an outer surface of the actuator rod, a set of block holes in the opening, where spacing between the block holes matches spacing between the rod holes, a light sensor positioned in a block hole of the set of block holes to sense light coming through a rod hole aligned with the block hole, and a ball bearing for each block hole of the set of block holes without a light sensor and extending partially through the corresponding block hole. The apparatus includes a verification module with a light modulator configured to modulate light of the light assembly to transmit a position signal, and a verification circuit configured to transmit a verification signal in response to the light sensor receiving the position signal. The apparatus includes a hole counter module configured to increment or decrement a hole counter in response to the position signal, and a direction detector configured to determine a direction of movement of the actuator block with respect to the actuator rod. The hole counter module increments the hole counter in response to the position signal and the direction detector determining that the actuator block is moving in a first direction with respect to the actuator rod and the hole counter module decrements the hole counter in response to the position signal and the direction detector determining that the actuator block is moving in a second direction with respect to the actuator rod. The second direction is opposite the first direction.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
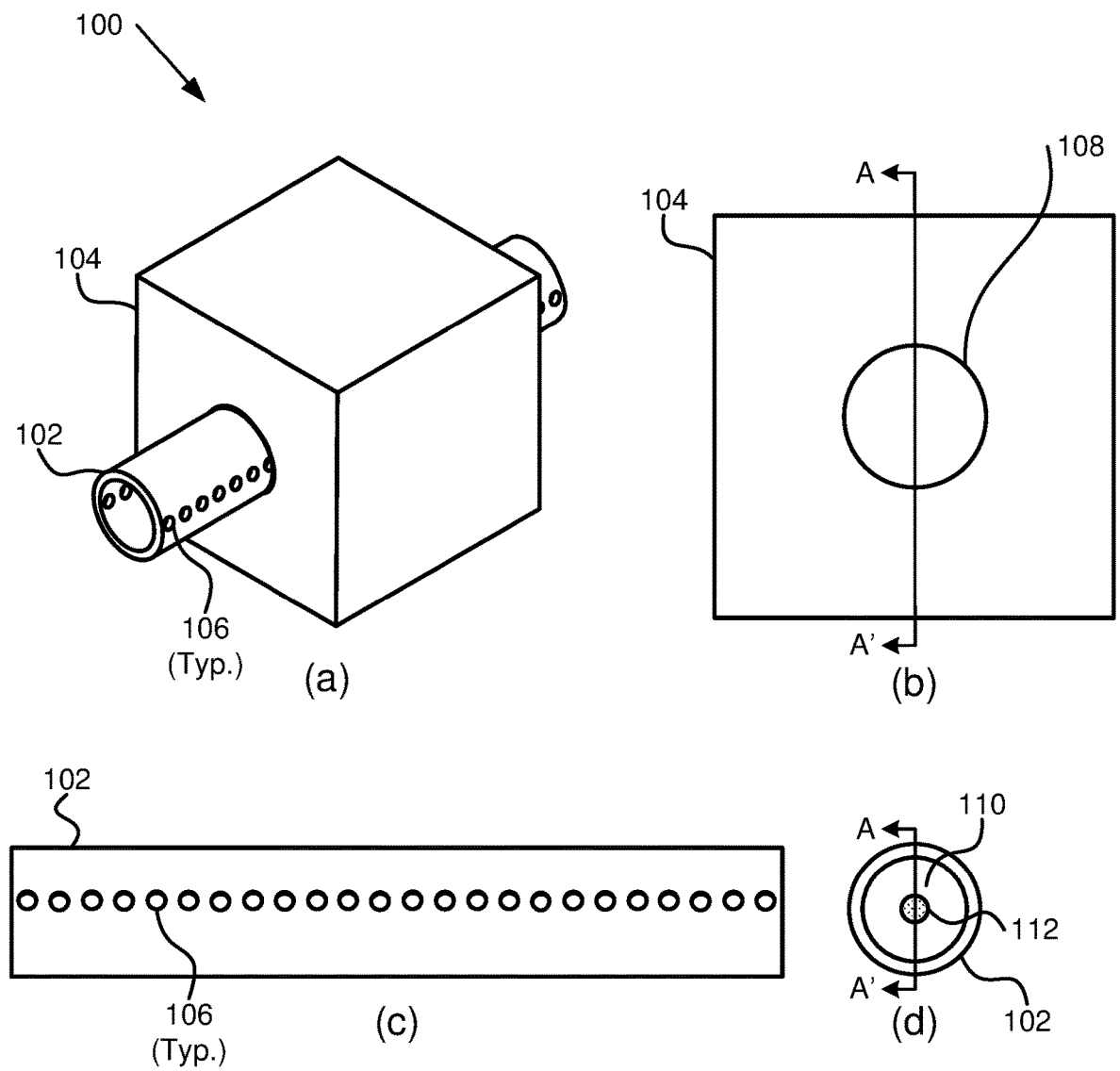
FIG. 1 is (a) an actuator apparatus perspective view, (b) an actuator block end view, (c) an actuator rod side view, and (d) an actuator rod end view illustrating a schematic block diagram of an actuator apparatus with precision bearings and light sensors, according to various embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system and/or apparatus with controls embodied as a method or computer program product. Accordingly, aspects of controls for the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the controls for the present invention may take the form of a computer program product embodied in one or more computer readable medium(s) having program code embodied thereon.

Many of the functional units for the controls described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module. Indeed, a module of program code may be a single instruction, or many instructions, and may even be distributed over several different code segments, among different programs, and across several memory devices. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

An actuator apparatus with precision bearings and light sensor includes an actuator rod with an interior cavity and a set of rod holes. Each rod hole of the set of rod holes extends through the actuator rod to the cavity. The set of rod holes is positioned in a straight line. The apparatus includes a light assembly that is positioned to light the cavity. The apparatus includes an actuator block that includes an opening extending through the actuator block sized to conform to an outer surface of the actuator rod and a set of block holes in the opening. Spacing between the block holes matches spacing between the rod holes. The actuator block includes a light sensor positioned in a block hole of the set of block holes to sense light coming through a rod hole aligned with the block hole and a ball bearing for each block hole of the set of block holes without a light sensor and extending partially through the corresponding block hole.

In some embodiments, the set of rod holes is a first set of rod holes, and the set of block holes is a first set of block holes, and the apparatus includes one or more additional sets of rod holes. The first set of rod holes and the one or more additional sets of rod holes are a plurality of sets of rod holes and are spaced equidistant around the actuator rod. In the embodiments, the apparatus includes one or more additional sets of block holes. The first set of block holes and the one or more additional sets of block holes are a plurality of sets of block holes and are spaced equidistant around the opening to align with the sets of rod holes of the plurality of sets of rod holes. In the embodiments, the apparatus includes a light sensor for each of the additional sets of block holes, each positioned in a block hole, and each block hole of the one or more additional sets of block holes without a light sensor includes a ball bearing.

In other embodiments, the rod holes of each of the one or more additional sets of rod holes is offset from the rod holes of the first set of rod holes and from each other in a direction along the first set of rod holes and each block hole of the one or more additional sets of block holes aligns with a block hole of the first set of block holes in a plane running perpendicular to a direction of the first set of block holes such that as the actuator block moves with respect to the actuator rod, rod holes of each of the plurality of sets of rod holes align with block holes at different times. In other embodiments, the block holes of the one or more additional sets of block holes is offset from the block holes of the first set of block holes and from each other in a direction of the first set of block holes and each rod hole of the one or more additional sets of rod holes aligns with a rod hole of the first set of rod holes in a plane running perpendicular to a direction of the first set of rod holes such that as the actuator block moves with respect to the actuator rod, rod holes of each of the plurality of sets of rod holes align with block holes at different times.

In other embodiments, the rod holes of each of the one or more additional sets of rod holes align with each other and the first set of rod holes in a direction of a plane running perpendicular to a direction along the first set of rod holes and the block holes of each of the one or more additional sets of block holes align with each other and block holes of the first set of block holes in a direction of a plane running perpendicular to a direction along the first set of block holes such that the rod holes of the first set of rod holes and the one or more additional sets of rod holes align with block holes of the first set of block holes and each of the one or more additional sets of block holes at a same time.

In some embodiments, the apparatus includes a spring mechanism behind each ball bearing pushing the ball bearing toward the opening where, as the actuator block moves relative to the actuator rod and rod holes align with block holes, each ball bearing extends into a rod hole. In other embodiments, the apparatus includes a hole counter module configured to increment or decrement a hole counter in response to the light sensor sensing light during alignment of a rod hole with a block hole. In further embodiments, the apparatus includes a direction detector configured to determine a direction of movement of the actuator block with respect to the actuator rod. The hole counter module increments the hole counter in response to the light sensor sensing light and the direction detector determining that the actuator block is moving in a first direction with respect to the actuator rod and the hole counter module decrements the hole counter in response to the light sensor sensing light and the direction detector determining that the actuator block is moving in a second direction with respect to the actuator rod. The second direction is opposite the first direction.

In some embodiments, the apparatus includes a mover apparatus configured to move the actuator block with respect to the actuator rod in a direction such that lines connecting each rod hole of the set of rod holes maintain alignment with lines connecting each block hole of the set of block holes. In other embodiments, the mover apparatus moves the actuator block along the actuator rod or the mover apparatus moves the actuator rod through the actuator block. In other embodiments, where the mover apparatus moves the actuator block along the actuator rod, the actuator rod is in a fixed position. In other embodiments, the mover apparatus includes an internal mover within the actuator block configured to engage the actuator rod, a separate mover component external to the actuator block configured to push and pull the actuator block with respect to the actuator rod, and/or a linear motor configured to move the actuator block with respect to the actuator rod magnetically.

In other embodiments, the mover apparatus is configured to maintain the actuator rod in alignment with the actuator block such that lines connecting each rod hole of the set of rod holes maintain alignment with lines connecting each block hole of the set of block holes. In other embodiments, the mover apparatus comprises free movement in a direction of movement of the actuator block with respect to the actuator rod. The free movement enables ball bearings positioned in block holes without a sensor to snap forward from one set of rod holes to another set of rod holes as the mover apparatus advances the actuator block with respect to the actuator rod.

In some embodiments, a shape of the actuator rod and a shape of the opening of the actuator block maintain the actuator rod in alignment with the actuator block such that lines connecting each rod hole of the set of rod holes maintain alignment with lines connecting each block hole of the set of block holes. In other embodiments, the actuator rod is linear and the rod holes run in a direction along a length of the actuator rod and the actuator block moves with respect to the actuator rod in a direction along the length of the actuator rod. In other embodiments, the actuator rod is round and the rod holes run in a direction around a circumference of the actuator rod and the actuator block rotates with respect to the actuator rod in a direction around the circumference of the actuator rod.

In some embodiments, the apparatus includes a bearing track within the actuator block between block holes. The actuator block includes ball bearings within the bearing track in excess of the block holes of the set of block holes. In the embodiments, the apparatus includes a bearing mover configured to move the ball bearings in the bearing track such that, for each block hole in the actuator block, a ball bearing in a block hole is moved out from over the block hole of the block hole and another ball bearing is moved into place over the block hole by action of the bearing mover.

A system with an actuator apparatus with precision bearings and light sensor includes an actuator rod with an interior cavity and a set of rod holes. Each rod hole of the set of rod holes extends through the actuator rod to the cavity. The set of rod holes are positioned in a straight line. The system includes a light assembly positioned to light the cavity and an actuator block. The actuator block includes an opening extending through the actuator block sized to conform to an outer surface of the actuator rod, a set of block holes in the opening. Spacing between the block holes matches spacing between the rod holes, a light sensor positioned in a block hole of the set of block holes to sense light coming through a rod hole aligned with the block hole, a ball bearing for each block hole of the set of block holes without a light sensor and extending partially through the corresponding block hole, and a spring mechanism behind each ball bearing pushing the ball bearing toward the opening. As the actuator block moves relative to the actuator rod and rod holes align with block holes, each ball bearing extends into a rod hole.

The system includes a hole counter module configured to increment or decrement a hole counter in response to the light sensor sensing light during alignment of a rod hole with a block hole. The system includes a mover apparatus configured to move the actuator block with respect to the actuator rod in a direction such that lines connecting each rod hole of the set of rod holes maintain alignment with lines connecting each block hole of the set of block holes. The system includes a direction detector configured to determine a direction of movement of the actuator block with respect to the actuator rod. The hole counter module increments the hole counter in response to the light sensor sensing slight and the direction detector determining that the actuator block is moving in a first direction with respect to the actuator rod and the hole counter module decrements the hole counter in response to the light sensor sensing light and the direction detector determining that the actuator block is moving in a second direction with respect to the actuator rod, the second direction opposite the first direction.

Another actuator apparatus with precision bearings and light sensor includes an actuator rod with an interior cavity and a plurality of sets of rod holes. Each rod hole extends through the actuator rod to the cavity. Each set of rod holes is positioned in a straight line along a length of the actuator rod. The sets of rod holes are spaced evenly around a circumference of the actuator rod. The apparatus includes a light assembly positioned to light the cavity and an actuator block. The actuator block includes an opening extending through the actuator block sized to conform to an outer surface of the actuator rod, and a plurality of sets of block holes in the opening. Spacing between the block holes matches spacing between the rod holes and each set of block holes aligned with a set of rod holes in a direction along the length of the actuator rod. The actuator block includes a plurality of light sensors with a light sensor for each set of block holes. The light sensor for a set of block holes is positioned in a block hole of the set of block holes to sense light coming through a rod hole aligned with the block hole.

The actuator apparatus includes a ball bearing for each block hole of each of the sets of block holes without a light sensor that extends partially through the corresponding block hole, and a spring mechanism behind each ball bearing pushing the ball bearing toward the opening. As the actuator block moves relative to the actuator rod and rod holes align with block holes, each ball bearing extends into a rod hole. The apparatus includes a hole counter module configured to increment or decrement a hole counter in response to a light sensor of the plurality of light sensors sensing light during alignment of a rod hole with a block hole.

In some embodiments, each set of rod holes of the plurality of sets of rod holes is offset from other sets of rod holes of the plurality of rod holes in a direction along the length of the actuator rod and each set of block holes of the plurality of sets of block holes aligns with other sets of block holes of the plurality of block holes in a direction around a circumference of the actuator rod, or each set of block holes of the plurality of sets of block holes is offset from other sets of block holes of the plurality of block holes in a direction along the length of the actuator rod and each set of rod holes of the plurality of sets of rod holes aligns with other sets of rod holes of the plurality of rod holes in a direction around a circumference of the actuator rod, such that as the actuator block moves with respect to the actuator rod, rod holes of a first set of rod holes of the plurality of rod holes align with corresponding block holes at a different time than rod holes of other sets of rod holes align with corresponding block holes.

An apparatus for securely verifying position of a rod hole with respect to a light sensor includes an actuator rod with an interior cavity and a set of rod holes. Each rod hole of the set of rod holes extends through the actuator rod to the cavity. The set of rod holes are positioned along a line. The apparatus includes a light assembly positioned to light the cavity and an actuator block with an opening in the actuator block sized to conform to an outer surface of the actuator rod and one or more block holes in the opening. Each of the one or more block holes is positioned to align with each of the set of rod holes as the actuator rod moves with respect to the actuator block. The actuator block includes a light sensor positioned in a block hole of the one or more block holes to sense light coming through a rod hole aligned with the block hole. The apparatus includes a verification module with a light modulator configured to modulate light of the light assembly to transmit a position signal, and a verification circuit configured to transmit a verification signal in response to the light sensor receiving the position signal.

In some embodiments, the verification module includes a position module configured to transmit an aligned signal in response to light at the light sensor reaching an alignment threshold and the light modulator transmits the position signal in response to the aligned signal. In other embodiments, the light assembly includes a fiber optic cable positioned with an end in the cavity and the light sensor comprises a receiver configured to receive light from the fiber optic cable. In other embodiments, the light assembly includes a light emitting diode ("LED") positioned in the cavity. In other embodiments, the light assembly includes a light source positioned to align with the light sensor through a rod hole of the set of rod holes.

In some embodiments, the cavity includes a surface that reflects light from the light assembly and/or the light assembly includes a light source positioned to illuminate the cavity and light within the cavity reaches the light sensor upon alignment of a rod hole of the set of rod holes with the light sensor. In other embodiments, the position signal is a digital signal. In other embodiments, the position signal includes a code unique to the actuator rod and/or the light assembly.

In some embodiments, the one or more block holes are a set of block holes and spacing between the block holes matches spacing between the rod holes and the apparatus includes a ball bearing for each block hole of the set of block holes without a light sensor. Each ball bearing extends partially through a block hole corresponding to the ball bearing. In further embodiments, the apparatus includes a spring mechanism behind each ball bearing pushing the ball bearing toward the opening. As the actuator block moves relative to the actuator rod and rod holes align with block holes, each ball bearing extends into a rod hole. In other embodiments, the set of rod holes is a first set of rod holes, and the set of block holes is a first set of block holes and the apparatus includes one or more additional sets of rod holes. The first set of rod holes and the one or more additional sets of rod holes are a plurality of sets of rod holes and are spaced equidistant around the actuator rod. In the embodiments, the apparatus includes one or more additional sets of block holes where the first set of block holes and the one or more additional sets of block holes are a plurality of sets of block holes and are spaced equidistant around the opening to align with the sets of rod holes of the plurality of sets of rod holes. In the embodiments, the apparatus includes a light sensor for each of the additional sets of block holes. Each light sensor is positioned in a block hole. Each block hole of the one or more additional sets of block holes without a light sensor includes a ball bearing.

In further embodiments, the apparatus includes a bearing track within the actuator block between block holes. The actuator block includes ball bearings within the bearing track in excess of the block holes of the set of block holes, and the apparatus includes a bearing mover configured to move the ball bearings in the bearing track such that, for each block hole in the actuator block, a ball bearing in a block hole is moved out from over the block hole of the block hole and another ball bearing is moved into place over the block hole by action of the bearing mover.

In some embodiments, the verification module includes a hole counter module configured to increment or decrement a hole counter in response to the position signal, and/or a direction detector configured to determine a direction of movement of the actuator block with respect to the actuator rod. In the embodiments, the hole counter module increments the hole counter in response to the position signal and the direction detector determining that the actuator block is moving in a first direction with respect to the actuator rod and the hole counter module decrements the hole counter in response to the position signal and the direction detector determining that the actuator block is moving in a second direction with respect to the actuator rod. The second direction is opposite the first direction.

In some embodiments, the apparatus includes a mover apparatus configured to move the actuator block with respect to the actuator rod in a direction such that lines connecting each rod hole of the set of rod holes maintain alignment with lines connecting each block hole of the set of block holes. In other embodiments, a shape of the actuator rod and a shape of the opening of the actuator block maintain the actuator rod in alignment with the actuator block such that lines connecting each rod hole of the set of rod holes maintain alignment with lines connecting each block hole of the set of block holes. In other embodiments, the actuator rod is linear and the rod holes run in a direction along a length of the actuator rod and the actuator block moves with respect to the actuator rod in a direction along the length of the actuator rod. In other embodiments, the actuator rod is round and the rod holes run in a direction around a circumference of the actuator rod and the actuator block rotates with respect to the actuator rod in a direction around the circumference of the actuator rod.

A system for securely verifying position of a rod hole with respect to a light sensor includes an actuator rod with an interior cavity and a set of rod holes. Each rod hole of the set of rod holes extends through the actuator rod to the cavity. Each rod hole of the set of rod holes is positioned along a line. The system includes a light assembly positioned to light the cavity and an actuator block. The actuator block includes an opening in the actuator block sized to conform to an outer surface of the actuator rod, one or more block holes in the opening, where each of the one or more block holes is positioned to align with each of the set of rod holes as the actuator rod moves with respect to the actuator block, a light sensor positioned in a block hole of the one or more block holes to sense light coming through a rod hole aligned with the block hole, and a verification module. The verification module includes a position module configured to transmit an aligned signal in response to light at the light sensor reaching an alignment threshold, a light modulator configured to modulate light of the light assembly to transmit a position signal in response to the aligned signal, and a verification circuit configured to transmit a verification signal in response to the light sensor receiving the position signal. The system includes a mover apparatus configured to move the actuator block with respect to the actuator rod in a direction such that lines connecting each rod hole of the set of rod holes maintain alignment with lines connecting each block hole of the set of block holes.

Another apparatus for securely verifying position of a rod hole with respect to a light sensor includes an actuator rod with an interior cavity and a set of rod holes. Each rod hole of the set of rod holes extends through the actuator rod to the cavity. The set of rod holes is positioned along a line. The apparatus includes a light assembly positioned to light the cavity and an actuator block. The actuator block includes an opening in the actuator block sized to conform to an outer surface of the actuator rod, a set of block holes in the opening, where spacing between the block holes matches spacing between the rod holes, a light sensor positioned in a block hole of the set of block holes to sense light coming through a rod hole aligned with the block hole, and a ball bearing for each block hole of the set of block holes without a light sensor and extending partially through the corresponding block hole. The apparatus includes a verification module with a light modulator configured to modulate light of the light assembly to transmit a position signal, and a verification circuit configured to transmit a verification signal in response to the light sensor receiving the position signal. The apparatus includes a hole counter module configured to increment or decrement a hole counter in response to the position signal, and a direction detector configured to determine a direction of movement of the actuator block with respect to the actuator rod. The hole counter module increments the hole counter in response to the position signal and the direction detector determining that the actuator block is moving in a first direction with respect to the actuator rod and the hole counter module decrements the hole counter in response to the position signal and the direction detector determining that the actuator block is moving in a second direction with respect to the actuator rod. The second direction is opposite the first direction.

In some embodiments, the verification module includes a position module configured to transmit an aligned signal in response to light at the light sensor reaching an alignment threshold and the light modulator transmits the position signal in response to the aligned signal.

Figure 2:
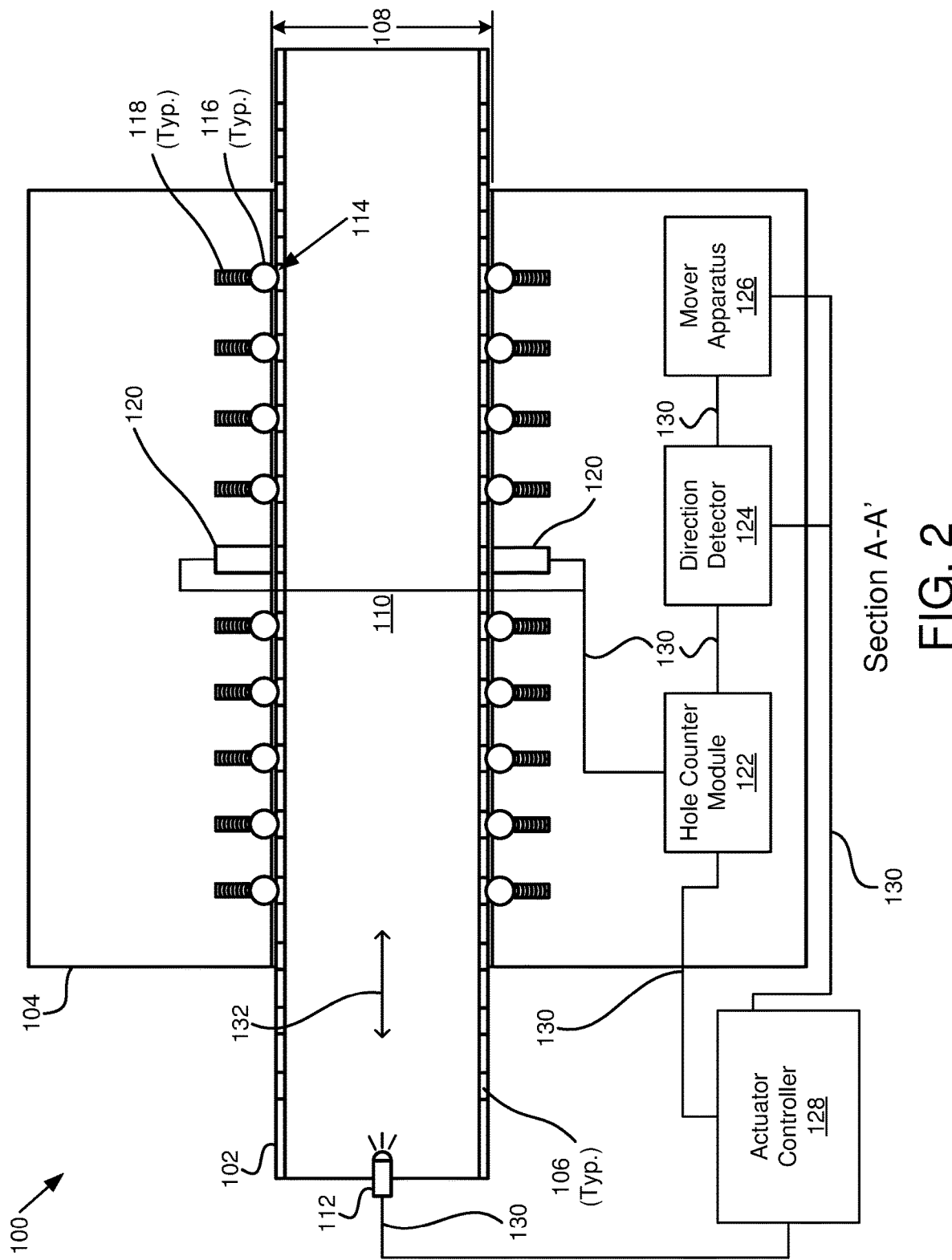
FIG. 2 is a section view further illustrating the schematic block diagram of the actuator apparatus of FIG. 1.

FIG. 1 is (a) an actuator apparatus perspective view, (b) an actuator block end view, (c) an actuator rod side view, and (d) an actuator rod end view illustrating a schematic block diagram of an actuator apparatus 100 with precision bearings and light sensors, according to various embodiments. FIG. 2 is a section view A-A' further illustrating the schematic block diagram of the actuator apparatus 100 of FIG. 1. The actuator apparatus 100 includes an actuator rod 102 with an interior cavity 110 and a set of rod holes 106. Each rod hole 106 of the set of rod holes 106 extends through the actuator rod 102 to the cavity 110. The set of rod holes 106 are positioned in a straight line. In some embodiments, the actuator apparatus 100 is an encoder configured to precisely report position of the actuator rod 102 with respect to an actuator block 104.

The actuator apparatus 100 includes a light assembly 112 positioned to light the cavity 110. Light from the light assembly 112 shines through the rod holes 106 because the rod holes 106 extend through the actuator rod 102 into the cavity 110. In some embodiments, the light assembly 112 includes a point source at an end of the actuator rod 102. In other embodiments, the light assembly 112 is located further inside the cavity 110 of the actuator rod 102. In other embodiments, the light assembly 112 includes multiple light sources, such as light emitting diodes ("LEDs"). In other embodiments, the multiple light sources are spread out within the actuator rod 102. In other embodiments, the light assembly 112 is located in the actuator block opposite from a light sensor 120 and the actuator rod 102 includes rod holes 106 on either side that align to allow light from the light assembly 112 in on one side of the actuator block 104 to shine across to the light sensor 120 through two aligned rod holes 106.

In some embodiments, the light assembly 112 includes point source for light, such as a single LED, that is capable of shining light in multiple directions. In some embodiments, the light assembly 112 produces light within a particular spectrum of light, such as visible light, colored light of a specific wavelength, infrared light, ultraviolet light, and the like. One of skill in the art will recognize other configurations for the light assembly 112 and other locations for part or all of the light assembly 112.

The actuator block 104 includes an opening 108 that extends through the actuator block 104 and is sized to conform to an outer surface of the actuator rod 102. The actuator rod 102 in the actuator apparatus 100 of FIG. 1 is round so the opening 108 is also round. In other embodiments, the actuator rod 102 has a different shaped cross section, such as an oval, square, rectangle, etc. and the opening 108 is similarly shaped and is slightly larger than an outer shape of the actuator rod 102 so that the actuator rod 102 is able to pass through the opening 108. An actuator rod 102 shaped differently than with a round cross section, in some embodiments, provides a mechanism to maintain the actuator rod 102 and actuator block 104 in a same alignment while the actuator rod 102 passes through the actuator block 104. In some embodiments, the actuator rod 102 and opening 108 in the actuator block 104 include a protrusion and corresponding groove, a key and a corresponding channel, or the like to keep the actuator rod 102 and actuator block 104 in alignment as the actuator rod 102 passes through the actuator block 104.

Figure 3:
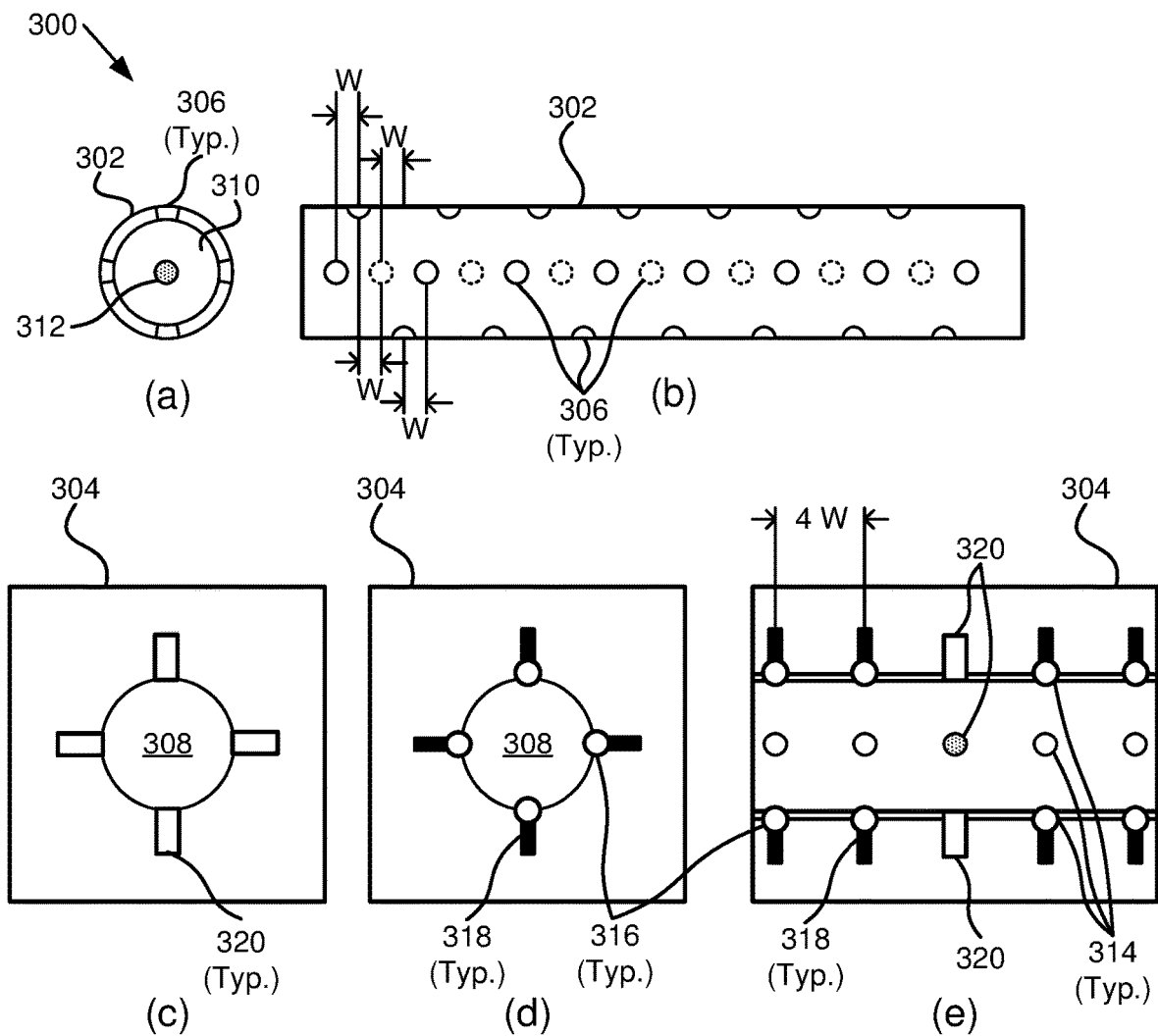
FIG. 3 is (a) an actuator rod end view, (b) an actuator rod side view, (c) an actuator block section view through light sensors, (d) an actuator block section view through ball bearings and springs, and (e) an actuator block side section view illustrating a schematic block diagram of an actuator apparatus with precision bearings and light sensors in four rows spaced around an actuator rod and opening in an actuator block with offset rod holes, according to various embodiments.
Figure 4:
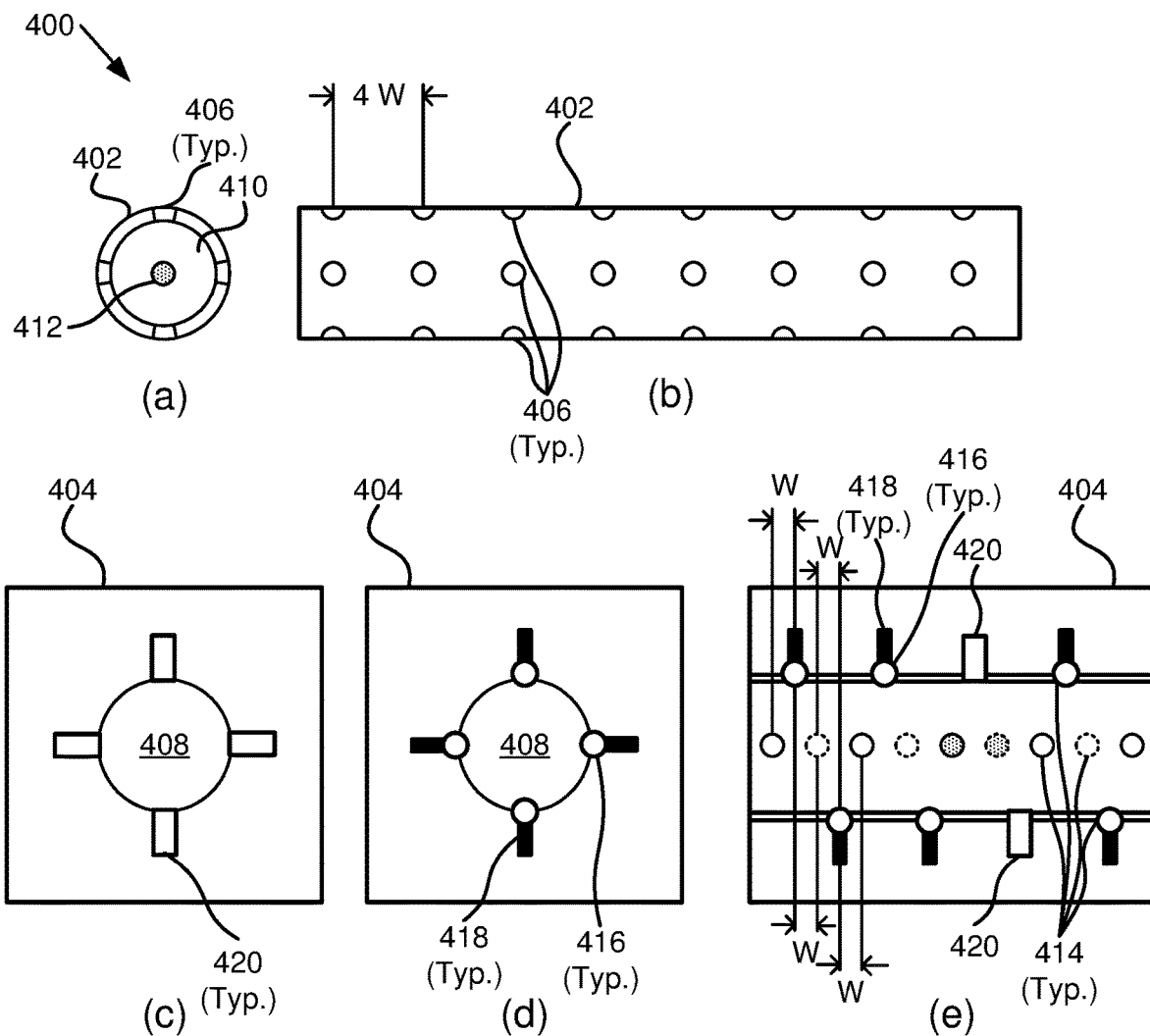
FIG. 4 is (a) an actuator rod end view, (b) an actuator rod side view, (c) an actuator block section view through light sensors, (d) an actuator block section view through ball bearings and springs, and (e) an actuator block side section view illustrating a schematic block diagram of an actuator apparatus with precision bearings and light sensors in four rows spaced around an actuator rod and opening in an actuator block with offset block holes, according to various embodiments.
Figure 5:
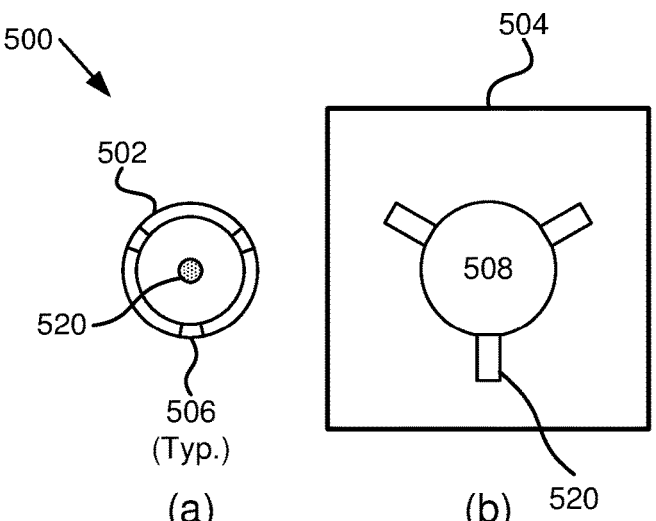
FIG. 5 is (a) an actuator rod end view, and (b) an actuator block section view through light sensors illustrating a schematic block diagram of an actuator apparatus with precision bearings and light sensors in three rows spaced around an actuator rod and opening in an actuator block, according to various embodiments.

The actuator block 104 includes two sets of block holes 114 in the opening 108. Other embodiments include one set of block holes 114 or more than two sets of block holes 114, as depicted in FIGS. 3-5. Spacing between the block holes 114 matches spacing between the rod holes 106. The actuator block 104 includes a light sensor 120 positioned in a block hole 114 of each of the sets of block holes 114 to sense light coming through a rod hole 106 aligned with the block hole 114. In other embodiments, the actuator block 104 includes sets of block holes 114 without a light sensor 120 which are used to reduce friction, used for alignment, etc. For example, the actuator block 104 may include four sets of block holes 114 and the actuator rod 102 also includes four sets of rod holes 106 aligned with the block holes 114 and only a single set of block holes 114 includes a light sensor 120. One of skill in the art will recognize other configurations with multiple sets of rod holes 106 and corresponding block holes 114 in an actuator rod 102 where one or more of the sets of block holes 114 include a light sensor 120.

In some embodiments, the actuator apparatus 100 includes a hole counter module 122 configured to increment or decrement a hole counter in response to the light sensor 120 sensing light during alignment of a rod hole 106 with a block hole 114. In some embodiments, the hole counter module 122 includes a zeroing function that resets the hole counter to zero. In some examples, the zeroing function zeros out the hole counter when the actuator rod 102 is in a particular position with respect to the actuator block 104. In other embodiments, the zeroing function zeros out the hole counter before the actuator rod 102 is inserted into the actuator block 104. One of skill in the art will recognize other times for the zeroing function to zero out the hole counter.

In some embodiments, the actuator apparatus 100 includes a direction detector 124 configured to determine a direction of movement of the actuator block 104 with respect to the actuator rod 102. The hole counter module 122 increments the hole counter in response to the light sensor 120 sensing light and the direction detector 124 determining that the actuator block 104 is moving in a first direction with respect to the actuator rod 102 and the hole counter module 122 decrements the hole counter in response to the light sensor 120 sensing light and the direction detector 124 determining that the actuator block 104 is moving in a second direction with respect to the actuator rod 102 where the second direction opposite the first direction.

In some embodiments, the size of the rod holes 106 and block holes relative to spacing between each of the rod holes 106, spacing between each of the block holes 114, and/or a size of a gap between the actuator rod 102 and opening 108 are configured so that the one or more light sensors 120 detect light from the light assembly 112 when a rod hole 106 aligns with a block hole 114 and do not detect light from the light assembly 112 with a rod hole 106 not aligned with a block hole 114. In some embodiments, the light sensor 120 typically begins to sense light just before alignment and/or upon partial alignment of the rod holes 106 and block holes 114 and light intensity reaches a peak upon full alignment. Typically, as a rod hole 106 passes a block hole 114, light intensity will increase to a peak value and then decrease to zero or at least to a minimum value. In some embodiments, the hole counter module 122 registers alignment of a rod hole 106 with a block hole 114 when light intensity sensed by the light sensors 120 reaches a light threshold.

The actuator block 104 includes a ball bearing 116 for each block hole 114 of the set of block holes without a light sensor 120 that extends partially through the corresponding block hole 114. The size of the opening 108 in the actuator block 104 relative to the actuator rod 102 along with the size of the block holes 114 and the ball bearings 116 are such that, for each ball bearing 116 of the actuator block 104, the ball bearing 116 extend partially into a rod hole 106 when the rod hole 106 is aligned with the block hole 114 from which the ball bearing 116 extends.

Figure 10A:
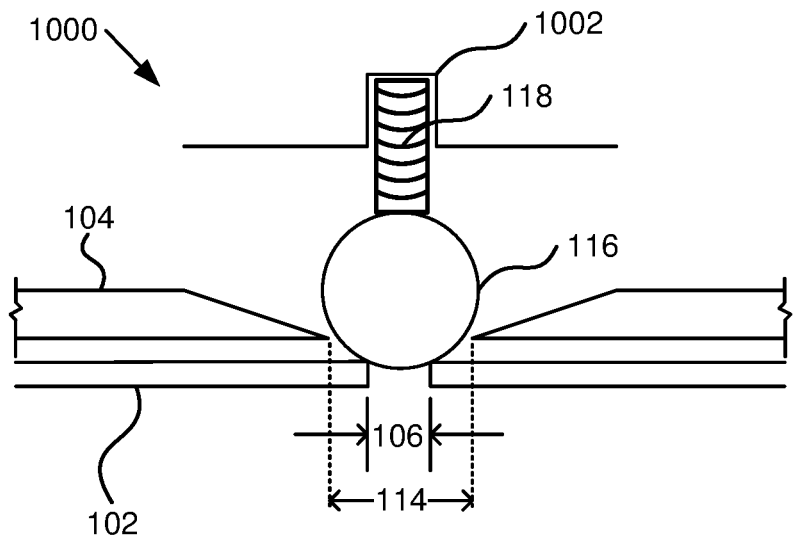
FIG. 10A is a schematic block diagram illustrating a ball bearing and spring mechanism, according to various embodiments.

The actuator block 104 includes a spring mechanism 118 behind each ball bearing 116 pushing the ball bearing 116 toward the opening 108. As the actuator block 104 moves relative to the actuator rod 102 and rod holes 106 align with block holes 114, each ball bearing 116 extends into a rod hole 106. As the actuator block 104 moves further relative to the actuator rod 102, the ball bearings 116 retract slightly and then extend into a next rod hole 106. In some embodiments, where the actuator rod 102 extends through the opening 108 past a point where rod holes 106 exist, the ball bearings 116 extend to a point where edges of the corresponding block hole 114 retain the ball bearing 116 from popping out of the block hole 114. A possible configuration is depicted in FIG. 10A.

The spring mechanism 118, in some embodiments, is a linear spring. In other embodiments, the spring mechanism 118 includes a spring in another form, such as an extension spring, a torsion spring, or the like. In some embodiments, the spring mechanism 118 is a coil spring, a flat spring, a leaf spring, a molded spring, a Belleville spring, or the like. In other embodiments, the spring mechanism 118 includes other elements, such as a sleeve, an end cap on the sleeve, or the like to keep the spring aligned with the corresponding block hole 114, from keeping the spring from popping out when a ball bearing 116 is not present over the block hole 114, etc. In other embodiments, the spring mechanism 118 includes another device that provides a spring force that is not a metal, such as a compressible rubber, or the like.

Figure 10B:
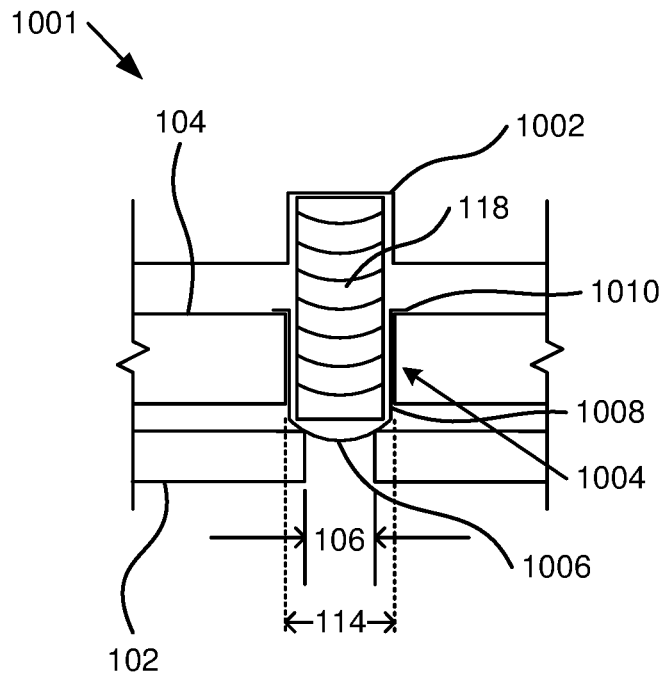
FIG. 10B is a schematic block diagram illustrating a ball bearing and spring mechanism with an alternate to using a ball bearing, according to various embodiments.

While the ball bearing 116 and spring mechanism 118 are depicted in FIG. 2 as a round ball and a spring behind the round ball, other embodiments include other designs. In some embodiments, the ball bearing 116/spring mechanism 118 include a sleeve with a cap with a spring in the sleeve where the sleeve extends through a corresponding block hole 114 towards the actuator rod 102. In some examples, the cap of a sleeve is rounded at least in a direction of movement of the actuator rod 102 to provide smooth movement of the actuator rod 102 without a sleeve and cap from catching in a rod hole 106, as depicted in FIG. 10B.

The ball bearings 116 extending into rod holes 106 provides a mechanism for the actuator rod 102 to move to a stable location during light sensing when ball bearings 116 are resting in rod holes 106, and then to move along to next rod holes 106 as the actuator block 104 moves with respect to the actuator rod 102. The ball bearings 116 provide a mechanism to allow movement of the actuator rod 102 with respect to the actuator block 104 in a precise way while discretely moving from rod hole 106 to rod hole 106.

The actuator apparatus 100, in some embodiments, includes a mover apparatus 126 configured to move the actuator block 104 with respect to the actuator rod 102 in a direction such that lines connecting each rod hole 106 of the set of rod holes 106 maintain alignment with lines connecting each block hole 114 of the set of block holes 114. For the actuator apparatus 100 of FIGS. 1 and 2, the actuator rod 102 moves through the actuator block 104 along a length of the actuator rod 102 as indicated by the arrow 132 in FIG. 2. In some embodiments, the actuator rod 102 is fixed and the mover apparatus 126 moves the actuator block 104. In other embodiments, the actuator block 104 is fixed and the mover apparatus 126 moves the actuator rod 102. In other embodiments, the mover apparatus 126 moves both the actuator rod 102 and the actuator block 104.

The mover apparatus 126, in some embodiments, is located in the actuator block 104. In some examples, the mover apparatus 126 includes wheels, gears, a gearbox, etc. to move the actuator block 104 from within the actuator block 104. In other embodiments, the mover apparatus 126 is external to the actuator block and/or actuator rod 102. In some examples, the mover apparatus 126 includes a gear drive, a worm drive, a pneumatic drive, a chain drive, a linear motor, or any other powered mechanism to move the actuator rod 102 with respect to the actuator block 104.

In some embodiments, the direction detector 124 is connected to the mover apparatus 126 and receives or derives a direction of the actuator rod 102 with respect to the actuator block 104 from the mover apparatus 126. In other embodiments, the direction detector 124 is in the mover apparatus 126. In other embodiments, the direction detector 124 is a signal from the mover apparatus 126. One of skill in the art will recognize other implementations of the direction detector 124 and/or other ways for the direction detector 124 to derive a direction signal.

In some embodiments, the mover apparatus 126 is controlled by an actuator controller 128. The actuator controller 128 is depicted external to the actuator block 104 but may be internal to the actuator block 104. In some embodiments, the actuator controller 128 includes controls, which may be levers, buttons, keys, a display, or other device for a person to control the actuator apparatus. In other embodiments, the actuator controller 128 is controlled by signals from other controls, such as a robotic controller that controls one or more robotic arms, movers, etc. attached to the actuator block 104 and/or actuator rod 102. In other embodiments, the actuator apparatus 100 is part of an assembly process or other process and the actuator controller 128 is controlled by or is part of a controller for the process. In some embodiments, the actuator controller 128 is connected to the hole counter module 122, the direction detector 124, the mover apparatus 126, the light assembly 112, the light sensors 120, and/or other component, which may be connected via wiring 130 or other conductors, and uses information from the direction detector 124, hole counter module 122, and other sources to control the mover apparatus 126. One of skill in the art will recognize other implementations of an actuator controller 128.

In some embodiments, the mover apparatus 126 facilitates manual movement of the actuator block 104 with respect to the actuator rod 102. In some examples, the mover apparatus 126 includes handles, buttons, grips, etc. to allow a user to move the actuator block 104 with respect to the actuator rod 102. For example, the actuator apparatus 100 may be used in a medical process and a surgeon manually moves the actuator rod 102 with respect to the actuator block 104 for precise placement of a medical device, for precise movement of a scalpel, scissors, etc. One of skill in the art will recognize other uses for the actuator apparatus 100.

As used herein, the phrasing of "the actuator rod 102 moving with respect to the actuator block 104" means the same as the phrasing of "the actuator block 104 moving with respect to the actuator rod 102" and each phrasing is intended only to convey movement of the actuator rod 102 relative to the actuator block 104 and has no bearing on which of the actuator rod 102 and the actuator block 104 is fixed.

FIG. 3 is (a) an actuator rod 302 end view, (b) an actuator rod 302 side view, (c) an actuator block 304 section view through light sensors 320, (d) an actuator block 304 section view through ball bearings 316 and springs 318, and (d) an actuator block 304 side section view illustrating a schematic block diagram of an actuator apparatus 300 with precision ball bearings 316 and light sensors 320 in four rows spaced around an actuator rod 302 and opening 308 in an actuator block 304 with offset rod holes 306, according to various embodiments. The actuator rod 302, actuator block 304, rod holes 306, opening 308 in the actuator block 304, cavity 310 in the actuator rod 302, light assembly 312, block holes 314, ball bearings 316, springs 318, and light sensors 320 are substantially similar to the actuator rod 102, actuator block 104, rod holes 106, opening 108 in the actuator block 104, cavity 110 in the actuator rod 102, light assembly 112, block holes 114, ball bearings 116, spring mechanism 118, and light sensors 120 of the actuator apparatus 100 of FIGS. 1 and 2.

In the actuator apparatus 300 of FIG. 3, there are four sets of rod holes 306 spaced evenly around the actuator rod 302 and four sets of block holes 314 with a same spacing around the opening 308 of the actuator block 304. In the embodiment of FIG. 3, each set of rod holes 306 is offset from other rod holes 306, as depicted in FIG. 3(*b*), while the sets of block holes 314 and light sensors 320 are aligned, as depicted in FIG. 3(*e*), so that as the actuator block 304 moves with respect to the actuator rod 302, a rod hole 306 of a first set of rod holes 306 will pass a light sensor 320 at a different time than a rod hole 306 of a second set of rod holes 306 passes a different light sensor 320. Note that the cross section in FIG. 3(*a*) is figurative to show spacing of the rod holes 306 around the actuator rod 102 and are offset as depicted in FIG. 3(*b*).

In the embodiment of FIG. 3, the sets of rod holes 306 are offset in a pattern. In FIG. 3(*b*), the rod holes 306 of the actuator rod 302 that are in the center that are solid are on a first side of the actuator rod 302 and the rod holes 306 that are in the center of the actuator rod 302 that are dashed are on a side of the actuator rod 302 opposite the first side. Looking at the cross section of the actuator rod 302 in FIG. 3(*a*), if a rod hole 306 at the top passes a light sensor 320 at the top of the opening 308 of the actuator block 304 first, a rod hole 306 on the left of the cross section of FIG. 3(*a*) will pass a light sensor 320 on the left side of the opening 308 of the actuator block 304, then a rod hole 306 at the bottom of the actuator rod 302 will pass a light sensor 320 at the bottom of the opening 308 of the actuator block 304, and then a rod hole 306 on the right side will pass a light sensor 320 on the right side of the opening 308 of the actuator block 304. Spacing between offset rod holes 306 is represented in FIG. 3(*b*) as "W" and spacing between block holes 314 is then 4 W.

In other embodiments, the rod holes 306 are offset in a different pattern, such as two sets of rod holes 306 opposite each other are aligned while two other sets of rod holes 306 are aligned with each other but offset from the other two sets of aligned rod holes 306. One of skill in the art will recognize other ways to offset rod holes 306 for various purposes.

An advantage of offset rod holes 306 is increased precision because the rod holes 306 have to travel a shorter distance before a light sensor 320 detects a next passing of a rod hole 306 than the embodiment of FIGS. 1 and 2. In the embodiment of FIG. 3, if a rod hole 306 passes a first light sensor 320, three other rod holes 306 pass different light sensors 320 before alignment of next rod hole 306 passes the first light sensor 320 again. The more sets of rod holes 306 spaced around the actuator rod 302 the more precision that may be provided for movement of the actuator rod 302 with respect to the actuator block 304.

In another embodiment, with rod holes 306 offset as depicted in FIG. 3(*b*), direction of movement of the actuator rod 302 may be tracked by tracking a sequence, clockwise or counterclockwise, of when each light sensor 320 detects a rod hole 306. If the sequence is in a clockwise pattern, the actuator rod 302 is moving in a first direction with respect to the actuator block 304 and if the sequence is counterclockwise, the actuator rod 302 is moving in a second direction with respect to the actuator block 304. In some embodiments, a direction detector 124 determines direction of the actuator rod 302 with respect to the actuator block 304 using the sequence of when light sensors 320 detect passing of a rod hole 306.

FIG. 4 is (a) an actuator rod 402 end view, (b) an actuator rod 402 side view, (c) an actuator block 404 section view through light sensors 420, (d) an actuator block 404 section view through ball bearings 416 and springs 418, and (e) an actuator block 404 side section view illustrating a schematic block diagram of an actuator apparatus 400 with precision ball bearings 416 and light sensors 420 in four rows spaced around an actuator rod 402 and opening 308 in an actuator block 404 with offset block holes 414, according to various embodiments. The actuator rod 402, actuator block 404, rod holes 406, opening 408 in the actuator block 404, cavity 410 in the actuator rod 402, light assembly 412, block holes 414, ball bearings 416, springs 418, and light sensors 420 are substantially similar to the actuator rod 102, actuator block 104, rod holes 106, opening 108 in the actuator block 104, cavity 110 in the actuator rod 102, light assembly 112, block holes 114, ball bearings 116, spring mechanism 118, and light sensors 120 of the actuator apparatus 100 of FIGS. 1 and 2.

In FIG. 4, the block holes 414 are offset while the rod holes 406 are aligned in a direction of along a length of the actuator rod 402. In the embodiment of FIG. 4, the sets of block holes 414 are offset in a pattern. In FIG. 4(e), the block holes 414 of the actuator block 404 that are in the center that are solid are on a first side of the opening 408 of the actuator block 404 and the block holes 414 that are in the center of the opening 408 of the actuator block 404 in a same row and that are dashed are on a side of the opening 408 opposite the first side, as depicted in FIGS. 4(c) and 4(d).

As with FIG. 3, looking at the cross section of the actuator rod 402 in FIG. 4(a), if a rod hole 406 at the top passes a light sensor 420 at the top of the opening 408 of the actuator block 404 first, a rod hole 406 on the left of the cross section of FIG. 4(a) will pass a light sensor 420 on the left side of the opening 408 of the actuator block 404, then a rod hole 406 at the bottom of the actuator rod 402 will pass a light sensor 420 at the bottom of the opening 408 of the actuator block 404, and then a rod hole 406 on the right side will pass a light sensor 420 on the right side of the opening 408 of the actuator block 404. Spacing between offset block holes 414 is represented in FIG. 4(e) as "W" and spacing between rod holes 406 is then 4 W.

Offset of the block holes 414 as in FIG. 4 has a same ability to increase precision as offsetting the rod hole 306 as in FIG. 3. Again, direction of the actuator rod 402 can be tracked by tracking a sequence of detection of rod holes 406 by the light sensors 420. The cross sections of FIGS. 4(c) and 4(d) are figurative to show spacing of the light sensors 420, ball bearings 416, and spring mechanisms 418 around the opening 408 of the actuator block 404 and are not intended to be accurate cross sections.

FIG. 5 is (a) an actuator rod 502 end view, and (b) an actuator block 504 section view through light sensors 520 illustrating a schematic block diagram of an actuator apparatus 500 with precision bearings and light sensors 520 in three rows spaced around an actuator rod 502 and opening 508 in an actuator block 504, according to various embodiments. FIG. 5 illustrates three rows of sets of rod holes 506 instead of four rows, as in FIGS. 3 and 4. The actuator apparatus 500 of FIG. 5 may have less precision of movement tracking than the actuator apparatuses 300, 400 of FIGS. 3 and 4. Having five rows would increase precision of movement tracking.

Figure 6:
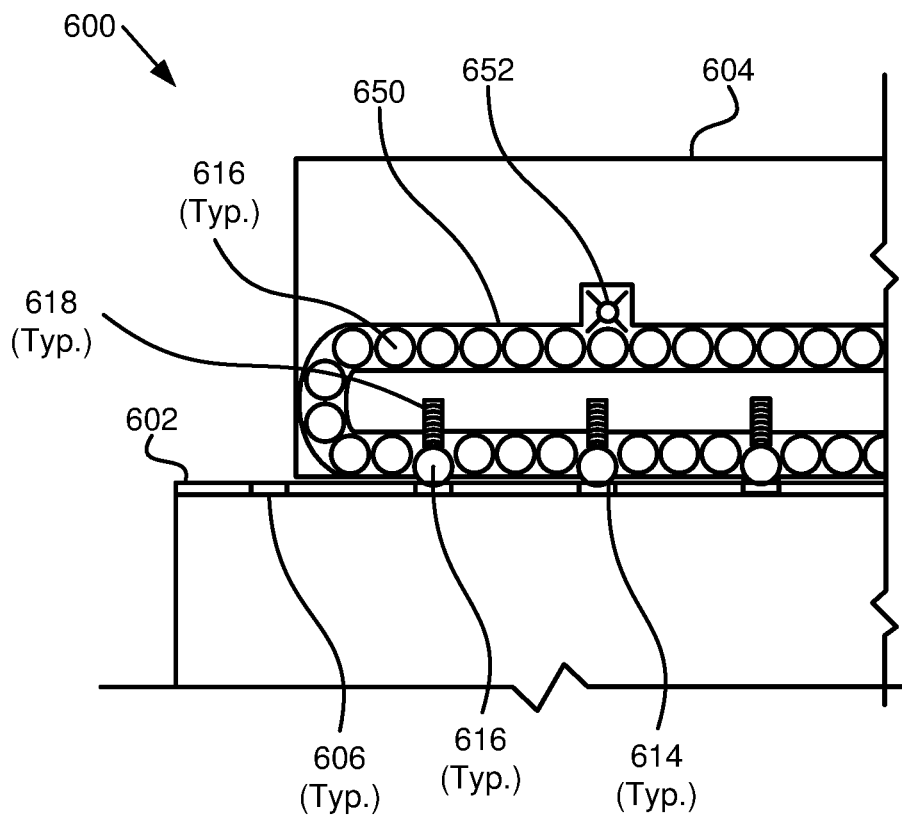
FIG. 6 is a partial section view of a schematic block diagram of an actuator apparatus with replaceable ball bearings, according to various embodiments.

FIG. 6 is a partial section view of a schematic block diagram of an actuator apparatus 600 with replaceable ball bearings 616, according to various embodiments. The actuator apparatus 600 includes an actuator rod 602 and an actuator block 604, which are substantially similar to other actuator rods 102, 302, 402, 502 and actuator blocks 104, 304, 404, 504 described herein. Where each block hole (e.g., 114, 314, 414) has a single ball bearing (e.g., 116, 316, 416), the ball bearings may develop a flat spot or may otherwise wear unevenly. The reciprocating ball bearings 616 offer a solution to prevent flats on the ball surface offer high use of the actuator apparatus 600. The design of the actuator apparatus 600 of FIG. 6 incorporates a unique spring actuated force against each ball bearing 616 to be positioned into a counter-sunk block hole 614 of the actuator block 604 and rod holes 606 along the actuator rod 602 as the ball bearings 616 move from block hole 614 to block hole 614.

The actuator apparatus 600 of FIG. 6 includes a bearing track 650 and bearing mover assembly 652 that pushes ball bearings 616 through the bearing track 650 so that a ball bearing 616 over block hole 614 and under a spring mechanism 618 that is moving in and out of rod holes 606 is moved aside and replaced with another ball bearing 616 on a regular basis. In some embodiments, the bearing mover assembly 652 moves ball bearings 616 continuously. In other embodiments, the bearing mover assembly 652 moves ball bearings 616 on a periodic basis. In other embodiments, the bearing mover assembly 652 moves ball bearings 616 while the actuator rod 602 is not moving with respect to the actuator block 604.

The actuator apparatus 600 of FIG. 6 is one possible design. Other actuator apparatuses include bearing replacement systems that are different. In some examples, bearing tracks and bearing mover assemblies are for fewer block hole locations. In other embodiments, the bearing track 650 includes less ball bearings 616 and the bearing mover assembly 652 includes a mechanism to advance ball bearings 616 other than each ball bearing 616 pushing on another ball bearing 616. One of skill in the art will recognize other ways to replace ball bearings 616.

Figure 7:
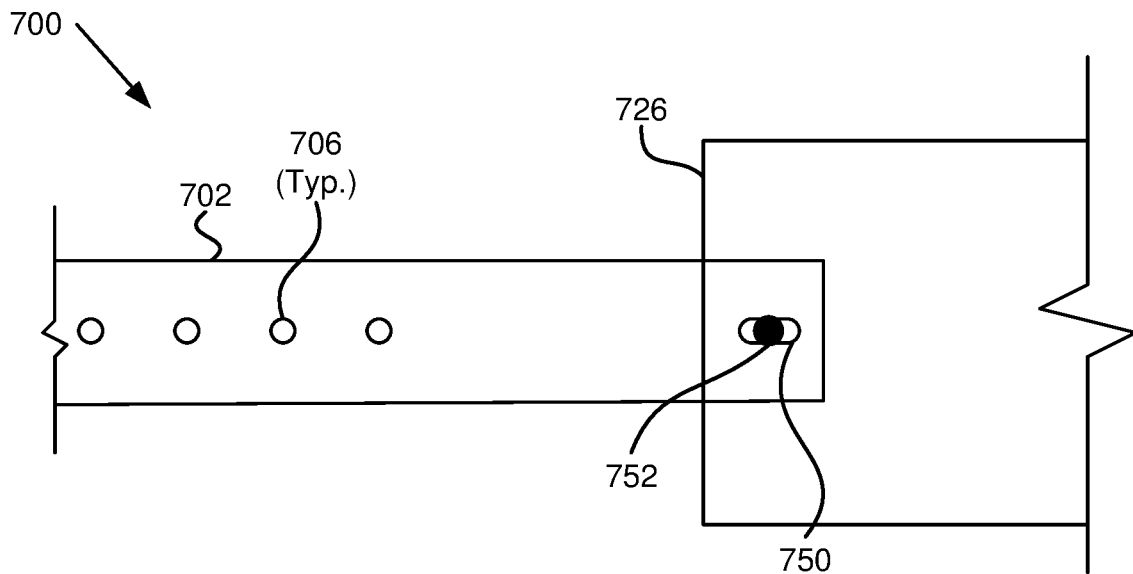
FIG. 7 is a schematic block diagram illustrating an actuator rod connected to a mover apparatus via a slot that allows for discrete movement of the actuator rod with respect to the actuator apparatus, according to various embodiments.

FIG. 7 is a schematic block diagram illustrating an actuator rod 702 connected to a mover apparatus 726 via a slot 750 that allows for discrete movement of the actuator rod 702 with respect to the actuator apparatus (not shown), according to various embodiments. In some embodiments, it is advantageous for the actuator rod 702 to snap forward to a next position of alignment of rod holes 706 and ball bearings (not shown but similar to the ball bearings 116, 316, 416, 616 described herein) so that as the actuator rod 702 moves with respect to the actuator block (not shown but similar to the actuator blocks 104, 304, 404, 504, 604 described herein) such that alignment between rod holes 706 and ball bearings is maintained before snapping to a next alignment of rod holes 706 and ball bearings.

The actuator apparatus 700 provides a mechanism for snapping between alignment positions by having a slot 750 with a pin 752 free to move back and forth within the slot 750. Length of the slot is based on spacing between the rod holes 706 such that as the mover apparatus 726 pushes or pulls the actuator rod 702, an end of the slot 750 contacts the pin 752 and motivates the actuator rod to move and snap to a next alignment position as the pin 752 moves within the slot 750. The actuator apparatus 700 of FIG. 7 includes one possible implementation that provides a more discrete movement of the actuator rod 702 with respect to an actuator block. One of skill in the art will recognize other designs appropriate for an actuator rod and actuator block configuration.

Figure 8:
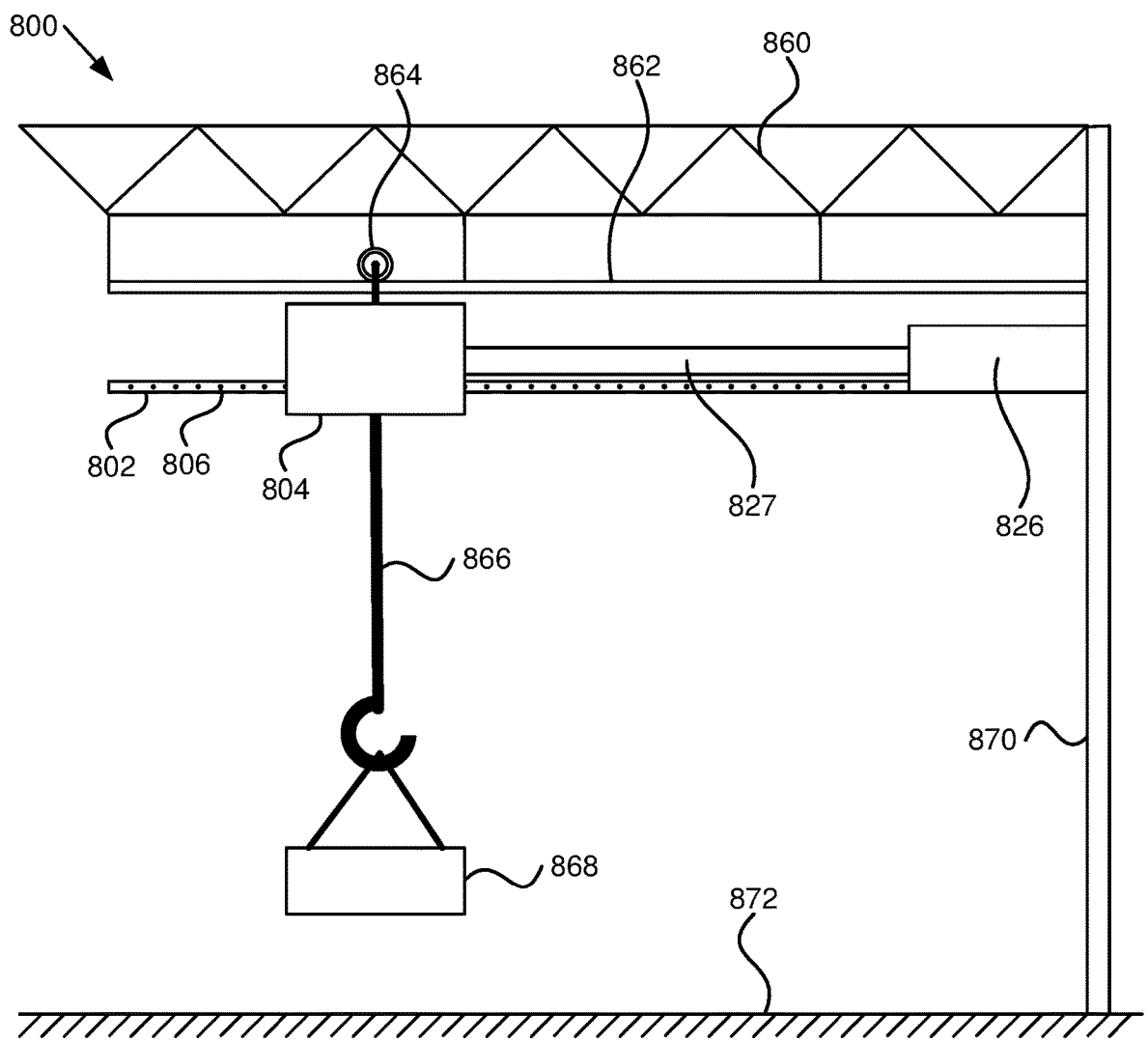
FIG. 8 is a schematic block diagram illustrating an application of an actuator apparatus with a fixed actuator rod and moving actuator block, according to various embodiments.

FIG. 8 is a schematic block diagram illustrating an application of an actuator apparatus 800 with a fixed actuator rod 802 and moving actuator block 804, according to various embodiments. The actuator apparatus 800 of FIG. 8 is one implementation and one of skill in the art will recognize other applications of the actuator apparatuses 100, 300, 400, 500, 600, 700 described herein.

The actuator block 804 is suspended from a track 862 connected to roof trusses 860 where the actuator block 804 moves via a wheel 864. A load 868 is suspended from the actuator block 804 via a cable and hook assembly 866. A mover apparatus 826 anchored to a wall 870 moves the actuator block 804 via a mover device 827, such as a rod from a pneumatic press, a worm gear rotated by a motor, a chain and pully system, etc. The actuator rod 802 is fixed and includes rod holes 806 spaced with enough precision to accurately move the load 868 to a particular position over a floor 872 before the cable and hook assembly 866 lowers the load 868.

Figure 9:
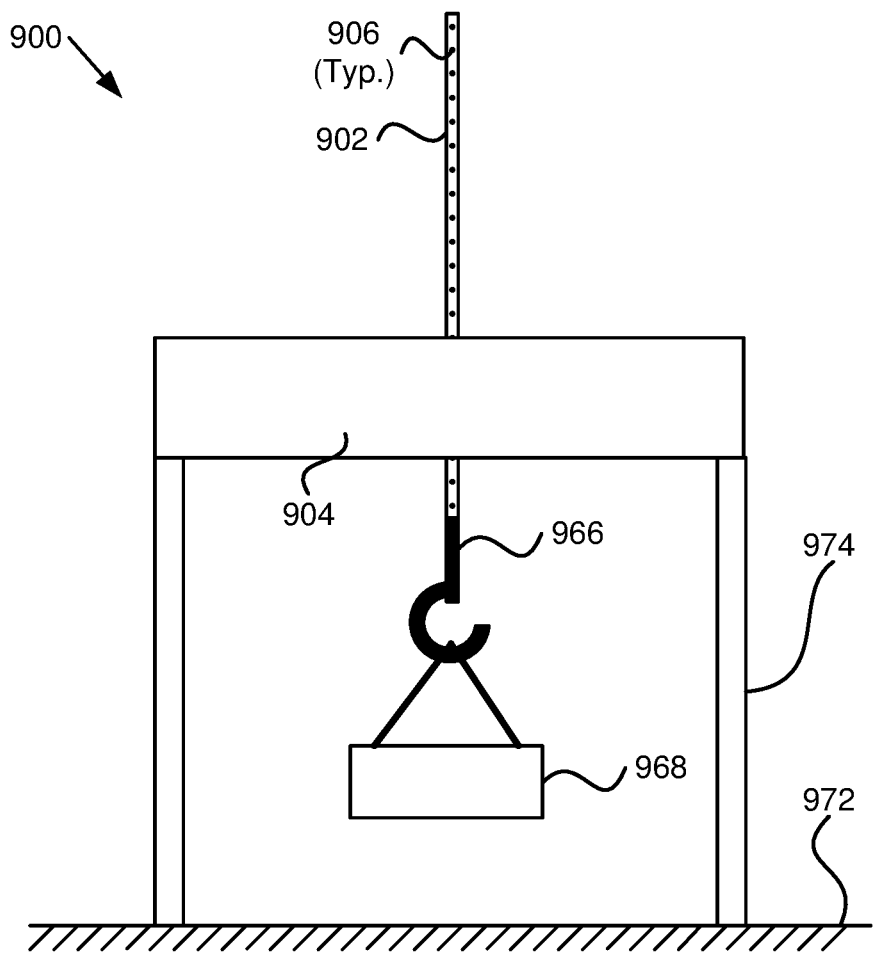
FIG. 9 is a schematic block diagram illustrating an application of an actuator apparatus with a fixed actuator block and moving actuator rod, according to various embodiments.

FIG. 9 is a schematic block diagram illustrating an application of an actuator apparatus 900 with a fixed actuator block 904 and moving actuator rod 902, according to various embodiments. The actuator rod 902 is connected to a hook 966 connected to a load 968 above a floor 972. The actuator block 904 is suspended with supports 974 above the floor 972. The actuator rod 902 includes rod holes 906 spaced sufficiently apart to provide adequate precision for keeping track of height of the load 968 above the floor. In the embodiment, a mover apparatus (e.g., 126) is internal to the actuator block 904 and moves the actuator rod 902. In other embodiments, an external mover apparatus is connected to the actuator rod 902. While the examples of FIGS. 8 and 9 include simple mechanisms for supporting a load, other more complex movers, robotics, etc. may be used in a process where an actuator rod and actuator block are used for precision movement.

FIG. 10A is a schematic block diagram illustrating a ball bearing and spring mechanism 1000, according to various embodiments. The ball bearing 116 is in a block hole 114 of an actuator block 104 that is slightly narrower than a diameter of the ball bearing 116 to retain the ball bearing 116 when an actuator rod 102 is not present. The ball bearing 116 is resting in a rod hole 106 of an actuator rod 102. The spring mechanism 118 presses on the ball bearing 116 and is depicted in a pocket 1002 of the actuator block 104. In some embodiments, the spring mechanism 118 includes a linear spring. In other embodiments, the spring mechanism 118 includes a spring within a sleeve, a capped sleeve, etc. to prevent the spring mechanism 118 from extending past a particular point, which would be useful for the actuator apparatus 600 of FIG. 6 with a bearing track 650. The block hole 114 is depicted as sloped on both sides, which would be appropriate for a bearing replacement system where a bearing track 650 includes other ball bearings 116 that push out the current ball bearing 116 while another ball bearing 116 moves over the block hole 114. The spring mechanism 118 is partially within a compartment 1002 that provides a backstop for the spring mechanism 118.

FIG. 10B is a schematic block diagram illustrating a ball bearing and spring mechanism 1001 with an alternate to using a ball bearing, according to various embodiments. The ball bearing and spring mechanism 1001 of FIG. 10B includes a spring 118 pushing on a cap 1004 shaped with a rounded end 1006 and cylindrical portion 1008 to accommodate an end of the spring 118. A collar section 1010 flairs out from the cylindrical portion 1008 to keep the cap 1004 retained in the block hole 114. The cap 1004 is long enough to extend into a rod hole 106. The rounded end 1006 provides ease in pushing the actuator rod 102 past the cap 1004. The rounded end 1006, in some embodiments, is spherical shaped. In other embodiments, the rounded end 1006 is rounded in a direction of movement of the actuator rod 102 with respect to the actuator block 104, such as a portion of a side of a cylinder. In such embodiments, the block holes 114 may be rectangular. As used herein, use of the term ball bearing (e.g. 116, 316, 416, 616) refers to a round ball bearing, to a ball bearing and spring mechanism 1001 as depicted in FIG. 10B, or other similar design with a rounded end that protrudes into an aligned rod hole (e.g. 106, 306, 406, 506, 606, 706, 806, 906) and is pushed toward an actuator rod (e.g. 102, 302, 402, 502, 602, 702, 802, 902) by a spring force.

Figure 11:
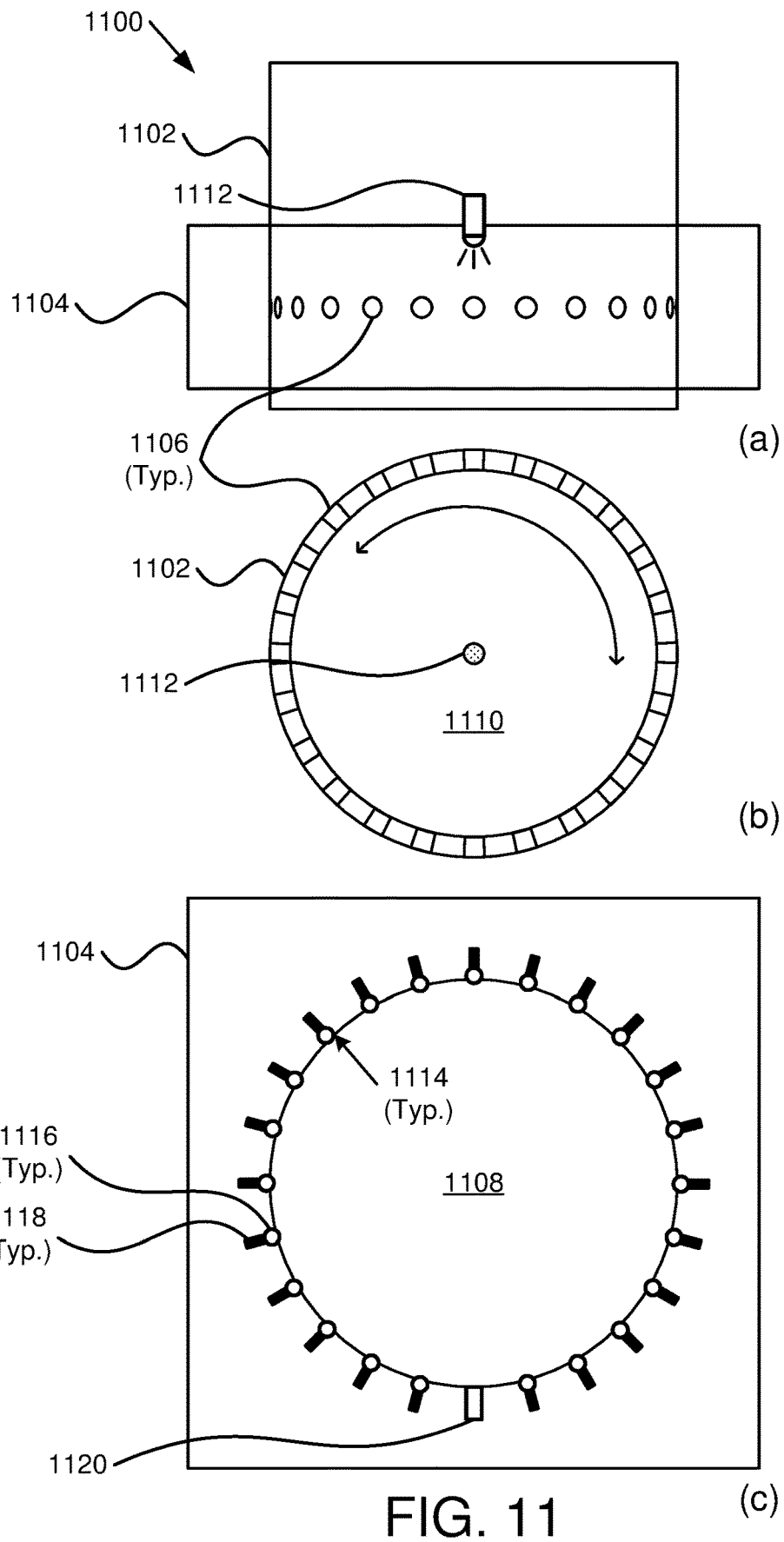
FIG. 11 is (a) a side transparent view of an actuator apparatus, (b) is a cross section view of an actuator rod, and (c) a cross section view of an actuator block for a rotary actuator apparatus, according to various embodiments.

FIG. 11 is (a) a side transparent view of a rotary actuator apparatus 1100, (b) is a cross section view of an actuator rod 1102, and (c) a cross section view of an actuator block 1104 for a rotary actuator apparatus 1100, according to various embodiments. An actuator rod 1102 rotates in an opening 1108 of an actuator block 1104 instead of being pushed through the actuator block 1104 as depicted in FIGS. 1-9. Rod holes 1106 are spaced around a circumference of the actuator rod 1102 and block holes 1114, ball bearings 1116 and associated springs 1118 are spaced around a circumference of the opening 1108 of the actuator block 1104. A light assembly 1112 is positioned the cavity 1110 of the actuator rod 1102 to shine through the rod holes 1106 and a light sensor 1120 is in a block hole 1114. While the rotary actuator apparatus 1100 of FIG. 11 depicts a single set of rod holes 1106 and block holes 1114, other embodiments may include additional sets of rod holes 1106 and block holes 1114 spaced above and/or below the rod holes 1106 of FIG. 11(a). The various descriptions of actuator apparatuses 100, 300, 400, 500, 600, 700, and spring mechanisms 1000, 1001 are applicable to the rotary actuator apparatus 1100 of FIG. 11.

In some embodiments, the opening 1108 of the actuator block 1104 extends all the way through the actuator block 1104 and the actuator rod 1102 extends through the opening 1108. In other embodiments, opening 1108 only extends partially through the actuator block 1104 and the actuator rod 1102 has an end that extends into the opening 1108. In some embodiments, the rotary actuator apparatus 1100 of FIG. 11 is used for a robotic arm or other location where rotational movement is controlled. In other embodiments, the rotary actuator apparatus 1100 is used for a gearbox. One of skill in the art will recognize other uses for tracking rotational movement.

Figure 12:
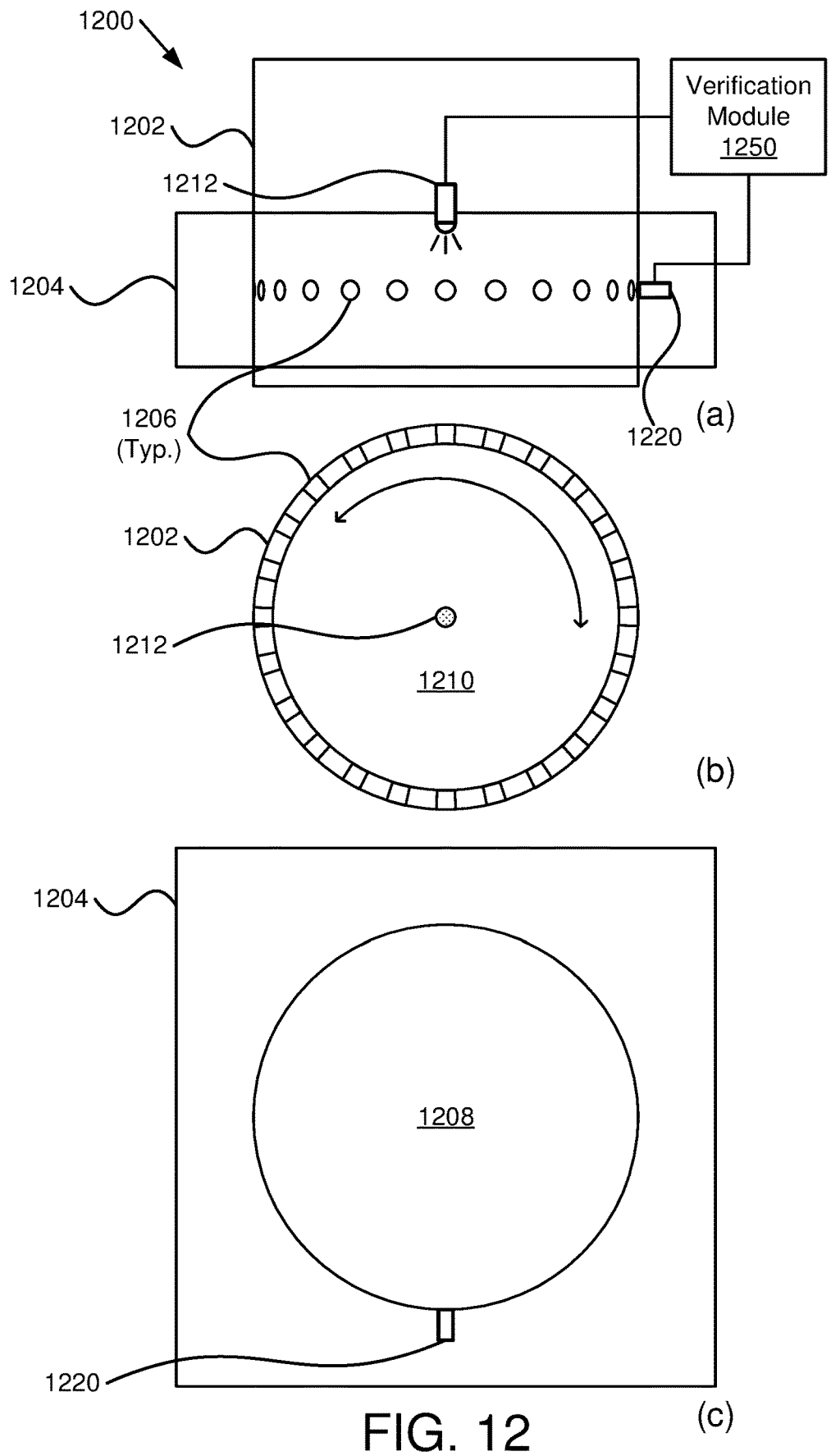
FIG. 12 is (a) a side transparent view of an actuator apparatus with a verification module, (b) is a cross section view of an actuator rod, and (c) a cross section view of an actuator block for a rotary actuator apparatus without ball bearings, according to various embodiments.

FIG. 12 is (a) a side transparent view of a rotary actuator apparatus 1200 with a verification module 1250, (b) is a cross section view of an actuator rod 1202, and (c) a cross section view of an actuator block 1204 for a rotary actuator apparatus 1200 without ball bearings, according to various embodiments. As with the rotary actuator apparatus 1100 of FIG. 11, an actuator rod 1202 rotates in an opening 1208 of an actuator block 1204 instead of being pushed through the actuator block 1204 as depicted in FIGS. 1-9. However, the actuator apparatuses 100, 300, 400, 500, 600, 700 of FIGS. 1-9, in various embodiments, include a verification module 1250 and operate similar to the actuator apparatus 1200 of FIG. 12.

Rod holes 1206 are spaced around a circumference of the actuator rod 1202 and a single light sensor 1220 is positioned in a block hole (not shown) in the opening 1208. A light assembly 1212 is positioned the cavity 1210 of the actuator rod 1202 to shine through the rod holes 1206 and the light sensor 1220 is in the block hole 1214. While the rotary actuator apparatus 1200 of FIG. 12 depicts a single set of rod holes 1206, other embodiments may include additional sets of rod holes 1206 and block holes spaced above and/or below the rod holes 1206 of FIG. 12(a). The various descriptions of actuator apparatuses 100, 300, 400, 500, 600, 700, 1100 and spring mechanisms 1000, 1001 are applicable to the rotary actuator apparatus 1200 of FIG. 12.

The rotary actuator apparatus 1200 includes a verification module 1250 that is configured to modulate light of the light assembly 1212 to transmit a position signal and to transmit a verification signal in response to the light sensor 1220 receiving the position signal. In some embodiments, the verification module 1250 is configured to transmit an aligned signal in response to light at the light sensor 1220 reaching an alignment threshold and the verification module 1250 transmits the position signal in response to the aligned signal. In some embodiments, the position signal is a digital signal generated by switching a light source of the light assembly 1212 on and off at a particular frequency where the light source being off represents a logic 0 and the light source being on represents a logic 1, or vice versa.

In some embodiments, the position signal is coded with a identifier specific to the location of the rotary actuator apparatus 1200. In other embodiments, the verification module 1250 is configured to cause the light assembly 1212 to transmit constant light until receiving the aligned signal and then to transmit the position signal. In other embodiments, the verification module 1250 is configured to cause the light assembly 1212 to continuously transmit the position signal and the light sensor 1220 is configured to transmit the verification signal once the light sensor 1220 is able to receive the position signal based on signal strength. The verification module 1250 is discussed in more detail below with regard to the apparatuses 1400, 1500 of FIGS. 14, and 15.

In some embodiments, the light assembly 1212 includes fiber optics. In some embodiments, the light assembly 1212 includes one or more strands of fiber optic cable that extend into the cavity 1210 and terminate in a way to shine light from an end of the fiber optic cables into the cavity 1210. Light from the ends of the one or more fiber optic cables reaches the rod holes 1206 and then to the light sensor 1220 upon alignment of a rod hole 1206 with the light sensor 1220. In some embodiments, at least one fiber optic cable shines light directly towards the rod holes 1206, and subsequently to the light sensor 1220.

In other embodiments, the fiber optic cable is positioned within the cavity 1210 to illuminate the cavity 1210 in such a way that light bounces around in the cavity 1210 and reaches the rod holes 1206 and light sensor 1220 upon alignment. In some embodiments, the fiber optic cable includes a spreader or other device to spread light from a fiber optic cable around within the cavity 1210 or at least in a direction of one or more light sensors 1220 in the actuator block 1204. In some embodiments, the cavity 1210 is treated to transmit light more efficiently than a non-treated cavity 1210. In some embodiments, the cavity 1210 is polished to increase light transmission. In other embodiments, the cavity 1210 is coated with paint or other reflective coating to increase light transmission. One of skill in the art will recognize other ways to increase light transmission in the cavity 1210.

In some embodiments, the light assembly 1212 includes a fiber optic transmitter connected to an end of the one or more fiber optic cables opposite the end(s) in the cavity 1210 shining light into the cavity 1210. The fiber optic transmitter is configured to generate light and/or light pulses over the fiber optic cable. In some embodiments, the fiber optic transmitter is controlled by the verification module 1250. In some embodiments, the fiber optic transmitter includes a light emitting diode ("LED"). In other embodiments, the fiber optic transmitter includes a laser diode. One of skill in the art will recognize other details, configurations, etc. for a fiber optic transmitter that may be controlled by the verification module 1250 to transmit light on fiber optic cable.

In some embodiments, the light assembly 1212 includes an LED as a light source where the LED shines light into the cavity 1210, rod holes 1206 and light sensor 1220. In some embodiments, the LED is positioned to shine light directly through a rod hole 1206 to the light sensor 1220. In other embodiments, the LED is positioned in the cavity 1210 to indirectly shine light to reach the rod holes 1206 and light sensor 1220. In other embodiments, the light assembly 1212 includes another type of light source, including light sources developed after filing of this Application.

In some embodiments, the actuator block 1204 includes multiple block holes with multiple light sensors 1220 (not shown). In the embodiments, the light sensors 1220 may be spread out at different locations around the opening 1208. In some embodiments, the verification module 1250 causes the light assembly 1212 to transmit light at different colors (e.g., different wavelength ranges) where each color has a different position signal encoded therein. In the embodiments, the different light sensors 1220 include a notch filter that filters out light outside of a particular color so that the light sensor 1220 senses the particular color. Thus, the light assembly 1212 is able to transmit different information to the different light sensors 1220 via transmission of different colors.

In some embodiments, the actuator rod 1202 includes multiple rows of rod holes 1206 adjacent to each other around the circumference of the actuator rod 1202 and the actuator block 1204 includes one or more light sensors 1220 per row. In some embodiments, spacing is adjusted between rod holes 1206 of the different rod holes 1206 of the rows to provide a finer position control than a single row of rod holes 1206. The different rows of rod holes 1206 is a concept similar to the actuator apparatus 300 of FIG. 3 except that the rod holes 106 are around the circumference of the actuator rod 1202.

Figure 13:
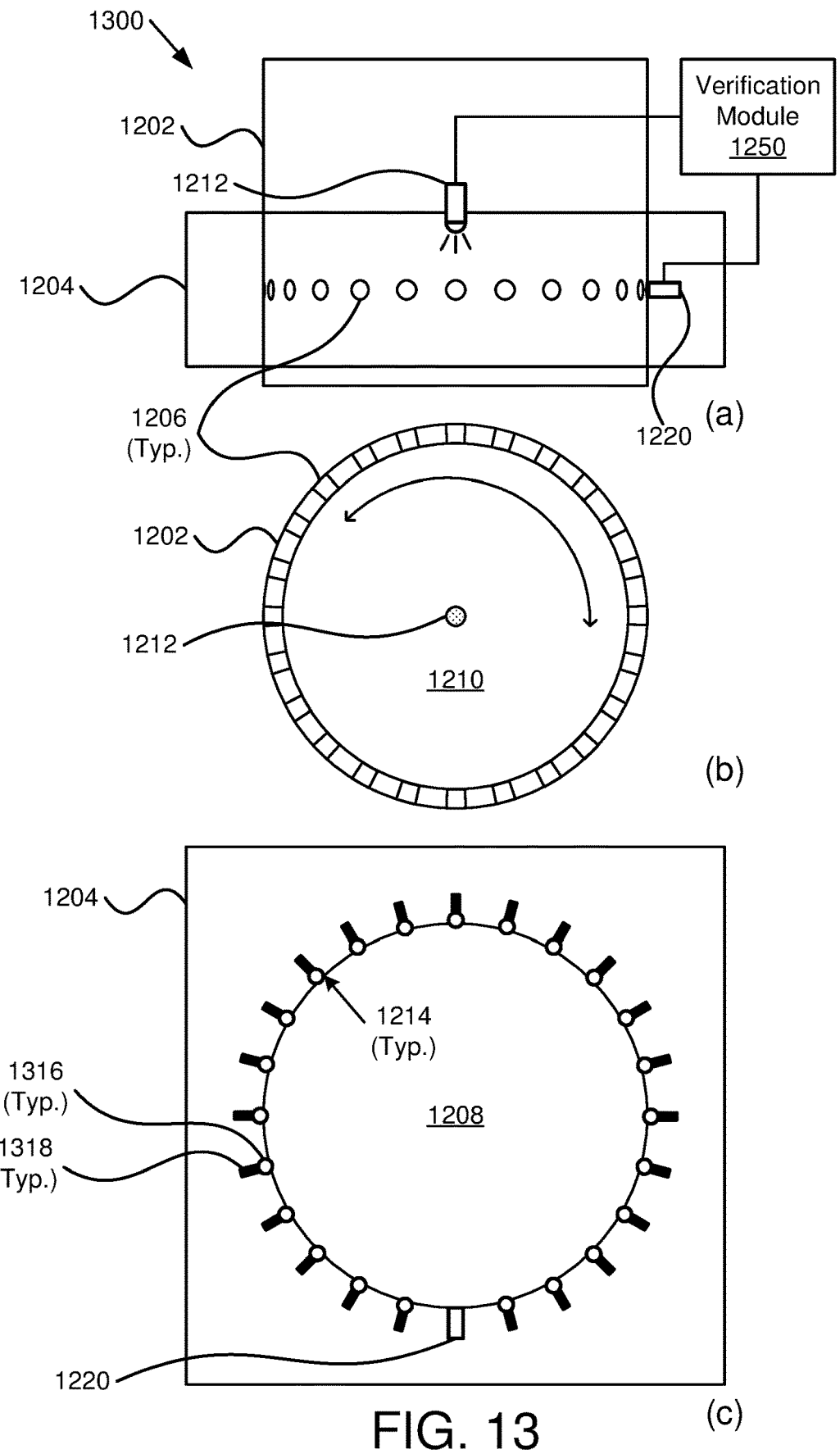
FIG. 13 is (a) a side transparent view of an actuator apparatus with a verification module, (b) is a cross section view of an actuator rod, and (c) a cross section view of an actuator block for a rotary actuator apparatus with ball bearings, according to various embodiments.

FIG. 13 is (a) a side transparent view of a rotary actuator apparatus 1300 with a verification module 1250, (b) is a cross section view of an actuator rod 1202, and (c) a cross section view of an actuator block 1204 for a rotary actuator apparatus 1300 with ball bearings 1316, according to various embodiments. The rotary actuator apparatus 1300 is substantially similar to the rotary actuator apparatus 1200 of FIG. 12 except with ball bearings 1316 in block holes 1214 positioned to extend into rod holes 1206 upon alignment of rod holes 1206 with the ball bearings 1316. The ball bearings 1316 and associated springs 1318 are spaced around a circumference of the opening 1208 of the actuator block 1204 and serve to at least momentarily retain the actuator rod 1202 in place when the ball bearings 1316 snap into a rod hole 1206, as described above. The ball bearings 1316 and associated spring mechanisms 1318 function similar to the ball bearings 1116 and spring mechanisms 1118 of FIG. 11.

Figure 14:
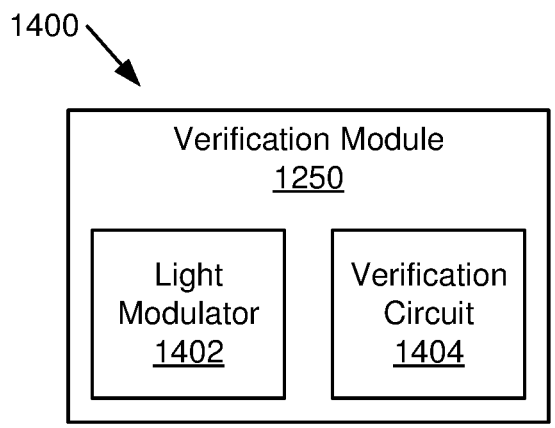
FIG. 14 is a schematic block diagram of an apparatus with a verification module for securely verifying position of a rod hole with respect to a light sensor, according to various embodiments.

FIG. 14 is a schematic block diagram of an apparatus 1400 with a verification module 1250 for securely verifying position of a rod hole 1206 with respect to a light sensor 1220, according to various embodiments. The verification module 1250 includes a light modulator 1402 and a verification circuit 1404, which are described below. In some embodiments, the verification module 1250 is implemented using various hardware circuits, such as a modulation circuit capable of switching light from the light assembly 1212 on and off, logic circuits configured to cause the modulation circuit to send a digital signal, circuitry configured to receive signals from the light sensor 1220 and to process the signals, and the like. In some embodiments, at least a portion of the verification module 1250 is implemented using an application specific integrated circuit ("ASIC"), a programmable logic array ("PAL"), etc. Is some embodiments, at least a portion of the verification module 1250 is implemented using executable code stored on computer readable storage media and executed using a processor. One of skill in the art will recognize various ways to implement the verification module 1250 using hardware circuits, a programmable logic device, and code stored on computer readable storage media.

The apparatus 1400 includes a light modulator 1402 configured to modulate light of the light assembly 1212 to transmit a position signal. In some embodiments, the light modulator 1402 modulates light of the light assembly 1212 by turning light from the light assembly 1212 on and off at a particular frequency and/or using a particular pattern. In some embodiments, the position signal is a digital signal transmitted by switching a light source of the light assembly 1212 on and off to send the position signal. In some embodiments, the position signal includes a location code that is unique to the location of the rotary actuator apparatus 1200, 1300. In some embodiments, the location code is followed by another bit pattern indicative of a rod hole 1206 being aligned with the light sensor 1220. In some embodiments, the bit pattern uses a sequence of one or more bits.

In some examples, the location code includes a number of bits sufficient to distinguish between various location codes of locations within a device using the rotary actuator apparatus 1200, 1300. In some embodiments, length of the location code is determined by how many locations are within a device using rotary actuator apparatuses 1200, 1300. In some examples, three bits may be used for up to eight locations, 5 bits may be used for up to 32 locations, 8 bits may be used for up to 256 locations, etc. A simple bit pattern following the location code may be one bit where logic 0 is not aligned and logic 1 is aligned. In other embodiments, the bit pattern may be more complex. In some examples, the bit pattern and/or position signal includes information related to position of the actuator rod 1202 with respect to the actuator block 1204, such as which rod hole 1206 is aligned with the light sensor 1220. In other embodiments, the position signal includes an initial sequence of bits signaling that signals that the location code and/or bit sequence is to follow. One of skill in the art will recognize other forms of a position signal.

The apparatus 1400 includes a verification circuit 1404 configured to transmit a verification signal in response to the light sensor receiving the position signal. In some embodiments, the verification signal merely indicates alignment of a rod hole 1206 with the light sensor 1220. In other embodiments, the verification signal includes additional information, such as the location code, position of the actuator rod 1202 with respect to the actuator block 1204, etc. In some embodiments, the verification circuit 1404 transmits the verification signal to a controller for a device that includes the rotary actuator apparatus 1200, 1300. In some examples, the device is a robot that includes one or more rotary actuator apparatuses 1200, 1300 located at various joints, pivot points, etc. The device may be any device described above with respect to the various descriptions of the actuator apparatuses 100, 300, 400, 500, 600, 700, 1100 and spring mechanisms 1000, 1001 described above. In some embodiments, the verification signal is in the form of a digital signal transmitted on a conductor to a controller or other device. In other embodiments, the verification signal is in the form of a message sent to a user. One of skill in the art will recognize other forms of a verification signal.

Figure 15:
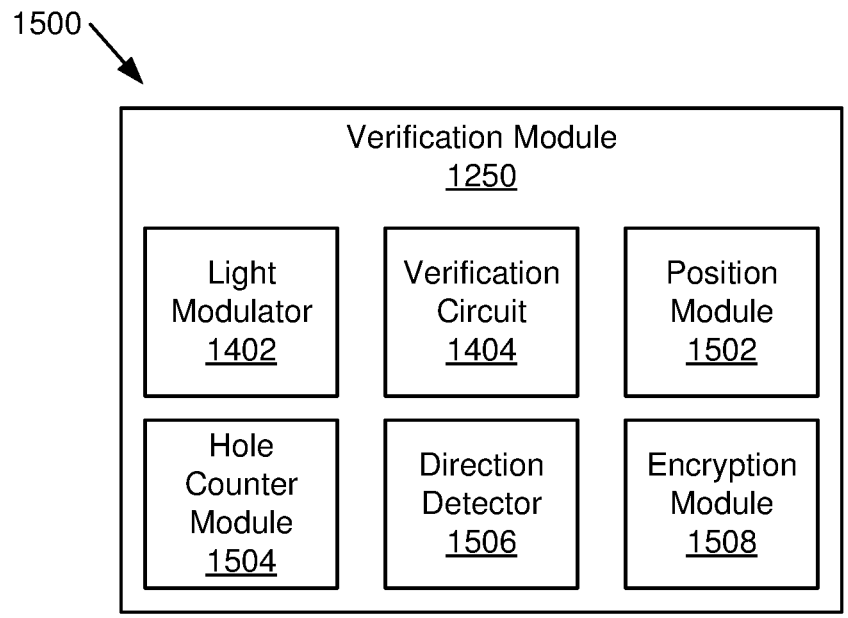
FIG. 15 is a schematic block diagram of another apparatus with a verification module for securely verifying position of a rod hole with respect to a light sensor, according to various embodiments.

FIG. 15 is a schematic block diagram of another apparatus 1500 with a verification module 1250 for securely verifying position of a rod hole 1206 with respect to a light sensor 1220, according to various embodiments. The verification module 1250 includes a light modulator 1402 and a verification circuit 1404, which are substantially similar to those described above with regard to the apparatus 1400 of FIG. 14. In various embodiments, the verification module 1250 includes a position module 1502, a hole counter module 1504, a direction detector 1506, and/or an encryption module 1508, which are described below. In various embodiments, the apparatus 1500 of FIG. 15 is implemented similarly to the apparatus 1400 of FIG. 14.

In some embodiments, the apparatus 1500 includes a position module 1502 configured to transmit an aligned signal in response to light at the light sensor 1220 reaching an alignment threshold. As the actuator rod 1202 moves with respect to the actuator block 1204, a rod hole 1206 moves from a misaligned position to an aligned position with respect to the light sensor 1220. As the rod hole 1206 starts to pass over the light sensor 1220, light from the light assembly 1212 begins to reach the light sensor 1220 and increases in intensity until the rod hole 1206 is aligned with the light sensor 1220. In some embodiments, initial intensity of light typically is too low for the light sensor 1220 to detect light and/or for the light sensor to function properly.

At a particular light intensity, the light sensor 1220, in some embodiments, functions to transmit a signal indicative of light being received at the light sensor 1220. In some embodiments, the light intensity sufficient for the light sensor 1220 to indicate that light is detected is the alignment threshold. In other embodiments, the position module 1502 senses light intensity received by the light sensor 1220 and the alignment threshold is above an intensity sufficient for the light sensor 1220 to indicate light intensity. Having an alignment threshold above a level of minimum function of the light sensor 1220, in some cases, is beneficial to help to ensure that a signal from the light sensor 1220 is based on proper functioning of the light sensor 1220.

The position module 1502 transmits the aligned signal in response to light at the light sensor reaching the alignment threshold. In some embodiments, the position module 1502 transmits the aligned signal by passing through a signal from the light sensor 1220. The aligned signal, in some embodiments, is a digital signal indicative of the rod hole 1206 being aligned with the light sensor 1220. In some embodiments, the position module 1502 transmits the aligned signal to the light modulator 1402, which transmits the position signal in response to receiving the aligned signal. In the embodiments, the aligned signal is indicative of the rod hole 1206 being aligned with the light sensor 1220 and the associated block hole 1214 through which the light sensor 1220 is positioned.

The apparatus 1500, in some embodiments, includes a hole counter module 1504 configured to increment or decrement a hole counter in response to the position signal. In some embodiments, the hole counter module 1504 increments or decrements the hole counter based on the aligned signal. In other embodiments, the hole counter module 1504 increments or decrements the hole counter based on the position signal.

In some embodiments, the verification module 1250 includes a direction detector 1506 configured to determine a direction of movement of the actuator block with respect to the actuator rod 1202. In some embodiments, the direction detector 1506 is from a mover apparatus 126, 726 that moves the actuator rod 1202 with respect to the actuator block 1204. In some examples, the direction detector 1506 derives a direction of the actuator rod 1202 with respect to the actuator block 1204 from a controller of the mover apparatus 126, 726. In other embodiments, the direction detector 1506 includes a sensor that detects movement of the actuator rod 1202 with respect to the actuator block 1204.

In some embodiments, the hole counter module 1504 increments the hole counter in response to the position signal and the direction detector 1506 determining that the actuator block 1204 is moving in a first direction with respect to the actuator rod 1202 and the hole counter module 1504 decrements the hole counter in response to the position signal and the direction detector 1506 determining that the actuator block 1204 is moving in a second direction with respect to the actuator rod 1202. The second direction is opposite the first direction. In various embodiments, the hole counter module 1504 and the direction detector 1506 are substantially similar to the hole counter module 122 and direction detector 124 of FIG. 2.

In some embodiments, the verification module 1250 includes an encryption module 1508 configured to encrypt one or more signals from the light sensor 1220 to a controller (not shown) and to encrypt one or more signals from the controller to the light assembly 1212. Encryption provides an additional way for securely verifying position of a rod hole 1206 with respect to a light sensor 1220. In some embodiments, the encryption module 1508 is dispersed with portions in the light sensor 1220, the light assembly 1212, a controller, etc. to encrypt and then to decrypt the position signal, verification signal, etc. The encryption module 1508, in various embodiments, includes a public key, a private key, and/or other keys and uses an encryption technique known to those of skill in the art.

Beneficially, the verification module 1250 provides a secure way to verify that a particular actuator rod 1202 has moved to a particular position. Providing feedback along with a digital code identifies the particular actuator apparatus 100, 300, 400, 500, 600, 700, 800, 900, 1100, 1200, 1300 and alignment of an actuator hole (e.g., 1206) with a light sensor (e.g., 1220). In sensitive equipment where a malicious party may want to intercept a signal from an actuator apparatus 100, 300, 400, 500, 600, 700, 800, 900, 1100, 1200, 1300 to provide false information to a controller, the verification module 1250 provides additional security.

Figure 16:
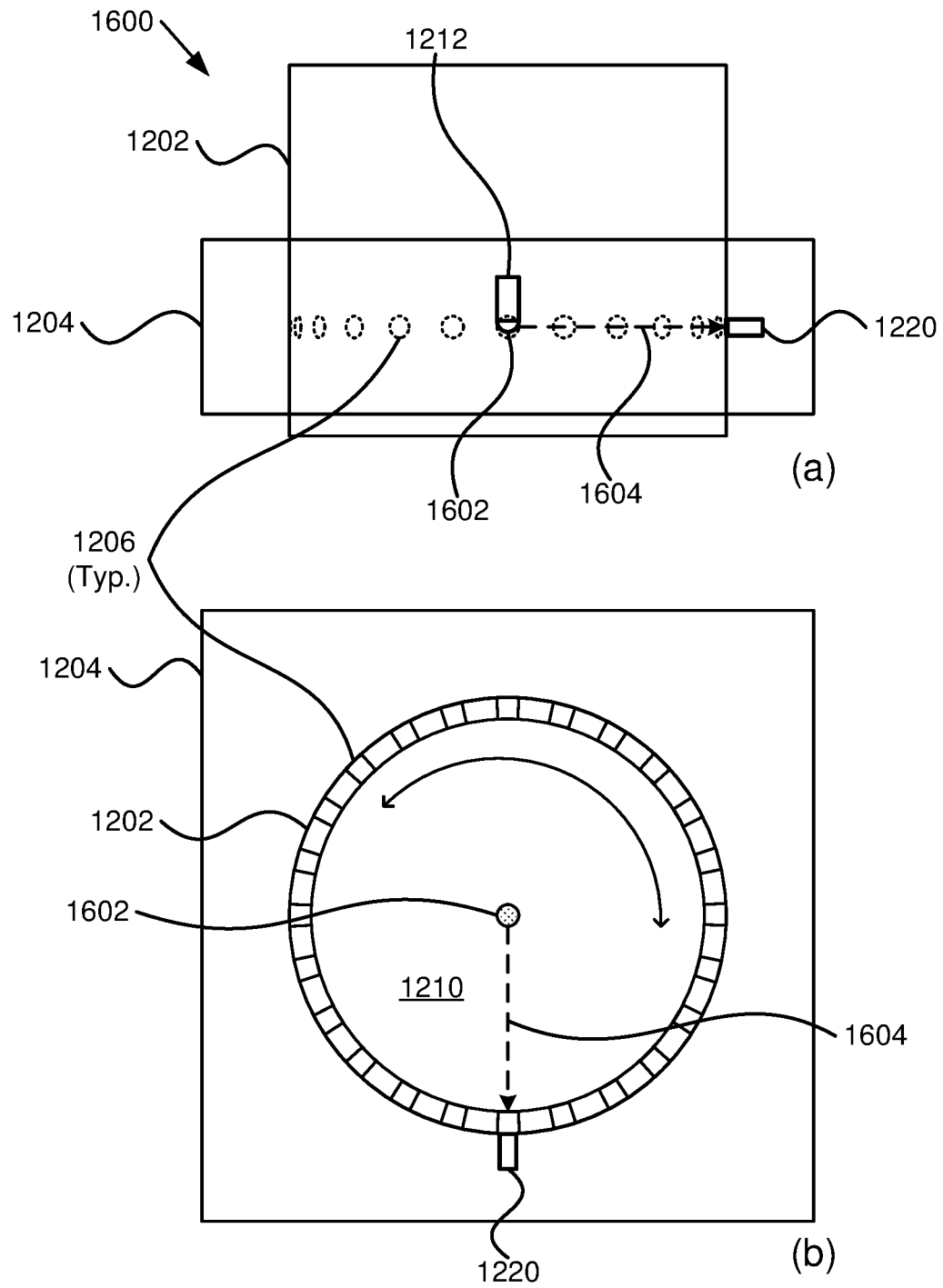
FIG. 16 is (a) a side transparent view and (b) a top view of an actuator apparatus with a light source in line with a light sensor, according to various embodiments.

FIG. 16 is (a) a side transparent view and (b) a top view of an actuator apparatus 1600 with a light source 1602 in line with a light sensor 1220, according to various embodiments. In the embodiments, the light source 1602 is at the end of a light assembly 1212 and is a point source that is positioned to align with the light sensor 1220. When a rod hole 1206 aligns with the light sensor 1220, light 1604 from the light source 1602 shines directly on the light sensor 1220. In some embodiments, the light source is an LED and the light assembly 1212 includes a structure and electrical components supporting the LED. In other embodiments, the light source is a fiber optic cable located and oriented to shine light 1604 directly onto the light sensor 1220. While the light source 1602 is depicted in the center of the actuator rod 1202, in other embodiments, the light source 1602 is located closer to the light sensor 1220.

Figure 17:
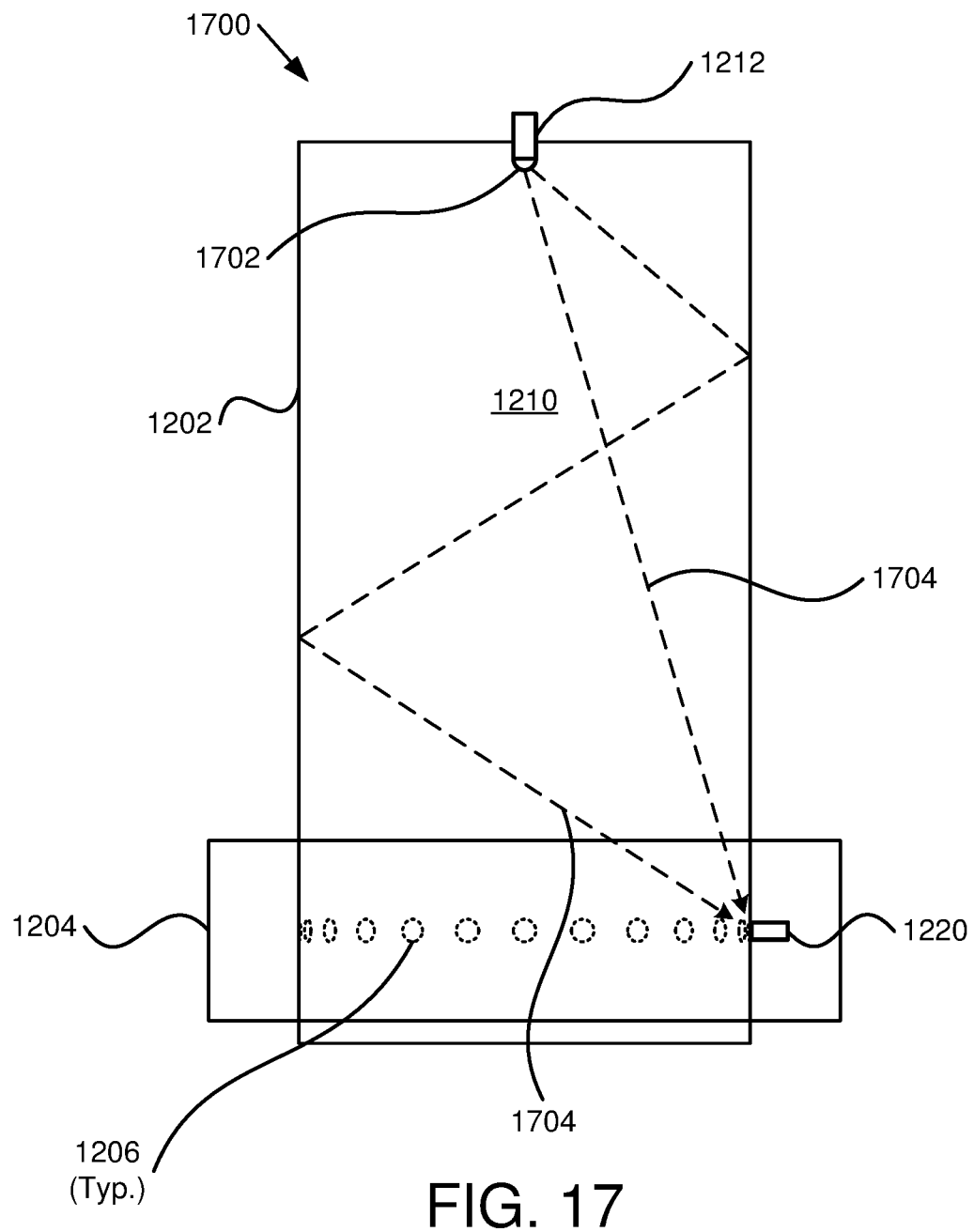
FIG. 17 is (a) a side transparent view and (b) a top view of an actuator apparatus with a light source offset from a light sensor, according to various embodiments.

FIG. 17 is (a) a side transparent view and (b) a top view of an actuator apparatus 1700 with a light source 1702 offset from a light sensor 1220, according to various embodiments. In the embodiments, the light source 1702 is placed so that light 1704 from the light source 1702 reaches the light sensor 1220 indirectly. As depicted, light 1704 from the light source 1702 bounces in the cavity 1210 before reaching the light sensor 1220. While some light 1704 may reach the rod hole 1206 directly from the light source 1702, the light 1704 would then need to reflect off sides of the rod hole 1206 to reach the light sensor 1220.

While two paths for the light 1704 are depicted, light 1704 from the light source 1702 will bounce around through the cavity 1210 in many directions, angles, etc. and some of the light 1704 will reach the light sensor 1220. Some light 1704 may be attenuated based on reflectiveness of the surface of the cavity 1210 where more reflective surfaces will propagate more light 1704 down the cavity 1210 to the light sensor 1220 than less reflective surfaces. Again, the light source 1702 may be an LED, an end of a fiber optic cable, or other type of lamp that emits light.

In some embodiments, the light modulator 1402 transmits the position signal synchronously. Where the light modulator 1402 transmits the position signal synchronously, data may be transferred at a higher rate than asynchronous transmission. Synchronous transmission typically includes data transmission in the form of blocks or fames and transmission is synchronized between the light assembly 1212 and light sensor 1220. In some embodiments, where the light source 1602 is in line with the light sensor 1220, synchronous transmission may be more feasible due to the direct nature of transmission of light 1604.

In other embodiments, the light modulator 1402 transmits the position signal asynchronously. Typically, asynchronous transmission includes data being sent in the form of a byte or bit character and is half-duplex type transmission. In asynchronous transmission, start bits and/or stop bits are included to the data to signal start of data and/or an end of the data. Where the light source 1702 is not in line with the light sensor 1220 and bounces at various angles through the cavity 1210, portions of the transmitted light 1704 may arrive at different times at the light sensor 1220 due to phase shift caused by different path lengths of the light 1704. To compensate, the light modulator 1402 may control transmission of the position signal at a lower frequency than for synchronous transmission and may use asynchronous transmission.

In some embodiments, the frequency of transmission of the position signal accounts for phase shift within the cavity 1210. In some examples, for a transition from logic 0 when light 1704 is off to a logic 1 when light 1704 is on, and a transition from logic 1 to logic 0, the transmission frequency is low enough to account for phase shift of light 1704 bouncing around the cavity 1210. Thus, the frequency is selected provide enough time between transitions between logic 0 and logic 1 and also transitions between logic 1 to logic 0 to compensate for any phase shift of light 1704 bouncing around and taking different pathways to the light sensor 1220. In various embodiments, asynchronous or synchronous transmission may be used for direct or indirect lighting in the cavity 1210, depending on the rate of transmission, expected speed of the actuator rod 1202 with respect to the actuator block 1204, etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. An apparatus comprising:
   an actuator rod comprising an interior cavity and a set of rod holes, each rod hole of the set of rod holes extending through the actuator rod to the cavity, the set of rod holes positioned along a line;
   a light assembly positioned to light the cavity;
   an actuator block comprising:

an opening in the actuator block sized to conform to an outer surface of the actuator rod;
one or more block holes in the opening, each of the one or more block holes positioned to align with each of the set of rod holes as the actuator rod moves with respect to the actuator block;
a light sensor positioned in a block hole of the one or more block holes to sense light coming through a rod hole aligned with the block hole; and
a verification module comprising:
a light modulator configured to modulate light of the light assembly to transmit a position signal; and
a verification circuit configured to transmit a verification signal in response to the light sensor receiving the position signal.

2. The apparatus of claim 1, wherein the verification module further comprises a position module configured to transmit an aligned signal in response to light at the light sensor reaching an alignment threshold and wherein the light modulator transmits the position signal in response to the aligned signal.

3. The apparatus of claim 1, wherein the light assembly comprises a fiber optic cable positioned with an end in the cavity and wherein the light sensor comprises a receiver configured to receive light from the fiber optic cable.

4. The apparatus of claim 1, wherein the light assembly comprises a light emitting diode ("LED") positioned in the cavity.

5. The apparatus of claim 1, wherein the light assembly comprises a light source positioned to align with the light sensor through a rod hole of the set of rod holes.

6. The apparatus of claim 1, wherein the cavity comprises a surface that reflects light from the light assembly and/or the light assembly comprises a light source positioned to illuminate the cavity and light within the cavity reaches the light sensor upon alignment of a rod hole of the set of rod holes with the light sensor.

7. The apparatus of claim 1, wherein the position signal comprises a digital signal.

8. The apparatus of claim 1, wherein the position signal comprises a code unique to the actuator rod and/or the light assembly.

9. The apparatus of claim 1, wherein the one or more block holes comprise a set of block holes, wherein spacing between the block holes matches spacing between the rod holes and further comprising a ball bearing for each block hole of the set of block holes without a light sensor, each ball bearing extending partially through a block hole corresponding to the ball bearing.

10. The apparatus of claim 9, further comprising a spring mechanism behind each ball bearing pushing the ball bearing toward the opening, wherein as the actuator block moves relative to the actuator rod and rod holes align with block holes, each ball bearing extends into a rod hole.

11. The apparatus of claim 9, wherein the set of rod holes comprises a first set of rod holes, and wherein the set of block holes comprise a first set of block holes and further comprising:
one or more additional sets of rod holes, wherein the first set of rod holes and the one or more additional sets of rod holes comprise a plurality of sets of rod holes and are spaced equidistant around the actuator rod;
one or more additional sets of block holes, wherein the first set of block holes and the one or more additional sets of block holes comprise a N plurality of sets of block holes and are spaced equidistant around the opening to align with the sets of rod holes of the plurality of sets of rod holes; and
a light sensor for each of the additional sets of block holes, each positioned in a block hole,
wherein each block hole of the one or more additional sets of block holes not comprising a light sensor comprises a ball bearing.

12. The apparatus of claim 9, further comprising:
a bearing track within the actuator block between block holes, wherein the actuator block comprises ball bearings within the bearing track in excess of the block holes of the set of block holes; and
a bearing mover configured to move the ball bearings in the bearing track such that, for each block hole in the actuator block, a ball bearing in a block hole is moved out from over the block hole of the block hole and another ball bearing is moved into place over the block hole by action of the bearing mover.

13. The apparatus of claim 1, wherein the verification module further comprises:
a hole counter module configured to increment or decrement a hole counter in response to the position signal; and/or
a direction detector configured to determine a direction of movement of the actuator block with respect to the actuator rod,
wherein the hole counter module increments the hole counter in response to the position signal and the direction detector determining that the actuator block is moving in a first direction with respect to the actuator rod and the hole counter module decrements the hole counter in response to the position signal and the direction detector determining that the actuator block is moving in a second direction with respect to the actuator rod, the second direction opposite the first direction.

14. The apparatus of claim 1, further comprising a mover apparatus configured to move the actuator block with respect to the actuator rod in a direction such that lines connecting each rod hole of the set of rod holes maintain alignment with lines connecting each block hole of the set of block holes.

15. The apparatus of claim 1, wherein a shape of the actuator rod and a shape of the opening of the actuator block maintain the actuator rod in alignment with the actuator block such that lines connecting each rod hole of the set of rod holes maintain alignment with lines connecting each block hole of the set of block holes.

16. The apparatus of claim 1, wherein the actuator rod is linear and the rod holes run in a direction along a length of the actuator rod and the actuator block moves with respect to the actuator rod in a direction along the length of the actuator rod.

17. The apparatus of claim 1, wherein the actuator rod is round and the rod holes run in a direction around a circumference of the actuator rod and the actuator block rotates with respect to the actuator rod in a direction around the circumference of the actuator rod.

18. A system comprising:
an actuator rod comprising an interior cavity and a set of rod holes, each rod hole of the set of rod holes extending through the actuator rod to the cavity, the set of rod holes positioned along a line;
a light assembly positioned to light the cavity;
an actuator block comprising:
an opening in the actuator block sized to conform to an outer surface of the actuator rod;

one or more block holes in the opening, each of the one or more block holes positioned to align with each of the set of rod holes as the actuator rod moves with respect to the actuator block; and a light sensor positioned in a block hole of the one or more block holes to sense light coming through a rod hole aligned with the block hole;

a verification module comprising:

a position module configured to transmit an aligned signal in response to light at the light sensor reaching an alignment threshold;

a light modulator configured to modulate light of the light assembly to transmit a position signal in response to the aligned signal; and a verification circuit configured to transmit a verification signal in response to the light sensor receiving the position signal; and a mover apparatus configured to move the actuator block with respect to the actuator rod in a direction such that lines connecting each rod hole of the set of rod holes maintain alignment with lines connecting each block hole of the set of block holes.

19. An apparatus comprising:

an actuator rod comprising an interior cavity and a set of rod holes, each rod hole of the set of rod holes extending through the actuator rod to the cavity, the set of rod holes positioned along a line;

a light assembly positioned to light the cavity;

an actuator block comprising:

an opening in the actuator block sized to conform to an outer surface of the actuator rod;

a set of block holes in the opening, wherein spacing between the block holes matches spacing between the rod holes;

a light sensor positioned in a block hole of the set of block holes to sense light coming through a rod hole aligned with the block hole; and a ball bearing for each block hole of the set of block holes without a light sensor and extending partially through the corresponding block hole;

a verification module comprising:

a light modulator configured to modulate light of the light assembly to transmit a position signal; and a verification circuit configured to transmit a verification signal in response to the light sensor receiving the position signal;

a hole counter module configured to increment or decrement a hole counter in response to the position signal; and a direction detector configured to determine a direction of movement of the actuator block with respect to the actuator rod, wherein the hole counter module increments the hole counter in response to the position signal and the direction detector determining that the actuator block is moving in a first direction with respect to the actuator rod and the hole counter module decrements the hole counter in response to the position signal and the direction detector determining that the actuator block is moving in a second direction with respect to the actuator rod, the second direction opposite the first direction.

20. The apparatus of claim 19, wherein the verification module further comprises a position module configured to transmit an aligned signal in response to light at the light sensor reaching an alignment threshold and wherein the light modulator transmits the position signal in response to the aligned signal.

* * * * *